United States Patent [19]
Braun et al.

[11] Patent Number: 5,924,539
[45] Date of Patent: Jul. 20, 1999

[54] FLUID-OPERATED APPARATUS FOR OPERATING ADJUSTABLE CONSTITUENTS OF MOTOR VEHICLES

[75] Inventors: Johannes Braun, Bühl; Urban Panther, Seelbach, both of Germany

[73] Assignee: LuK Getriebe-Systeme GmbH, Buhl/Baden, Germany

[21] Appl. No.: 08/861,982

[22] Filed: May 22, 1997

Related U.S. Application Data

[30] Foreign Application Priority Data

May 24, 1996 [DE] Germany ............................ 196 21 105

[51] Int. Cl.⁶ .................................................. F16D 48/06
[52] U.S. Cl. .................... 192/109 F; 91/469; 137/625.64
[58] Field of Search ....................... 192/109 F; 60/547.1, 60/574; 137/625.6, 625.64; 91/469; 477/158

[56] References Cited

U.S. PATENT DOCUMENTS

| | | | |
|---|---|---|---|
| 2,721,640 | 10/1955 | De Feo et al. ........................ | 192/109 F |
| 3,351,170 | 11/1967 | Hengstler ........................ | 192/109 F X |
| 4,265,346 | 5/1981 | Emmadi ........................ | 192/109 F X |
| 4,899,785 | 2/1990 | Inokuchi ........................ | 192/109 F X |
| 4,989,710 | 2/1991 | Reik et al. . | |
| 5,135,091 | 8/1992 | Albers et al. . | |
| 5,169,365 | 12/1992 | Friedmann . | |
| 5,295,915 | 3/1994 | Friedmann . | |
| 5,301,783 | 4/1994 | Malloy ............................ | 192/109 F X |
| 5,377,796 | 1/1995 | Friedmann et al. . | |
| 5,509,448 | 4/1996 | Wilson et al. .................. | 192/109 F X |

*Primary Examiner*—Rodney H. Bonck
*Attorney, Agent, or Firm*—Darby & Darby

[57] ABSTRACT

A fluid-operated system which can supply a pressurized fluid (e.g., oil) to one or more adjustable consumers (such as a clutch and/or a transmission) in a motor vehicle. The system employs one or more fluid pressurizing pumps and/or accumulators and an arrangement of valves in a path for pressurized fluid from the pressurizing unit(s) to the consumer (s). The valves can vary the fluid pressure in dependency upon at least one variable (such variable can be selected by a control unit in conjunction with an actor). In accordance with one presently preferred embodiment, the valves can cooperate with one or more flow restrictors to impart to the fluid in the path a first pressure within a first range of varying pressures as a first function of the at least one variable, and a second pressure within a second range of varying pressures as a different second function of the at least one variable. One of the valves can be embodied in or located outside of the mobile valving element and/or housing of another valve.

54 Claims, 12 Drawing Sheets

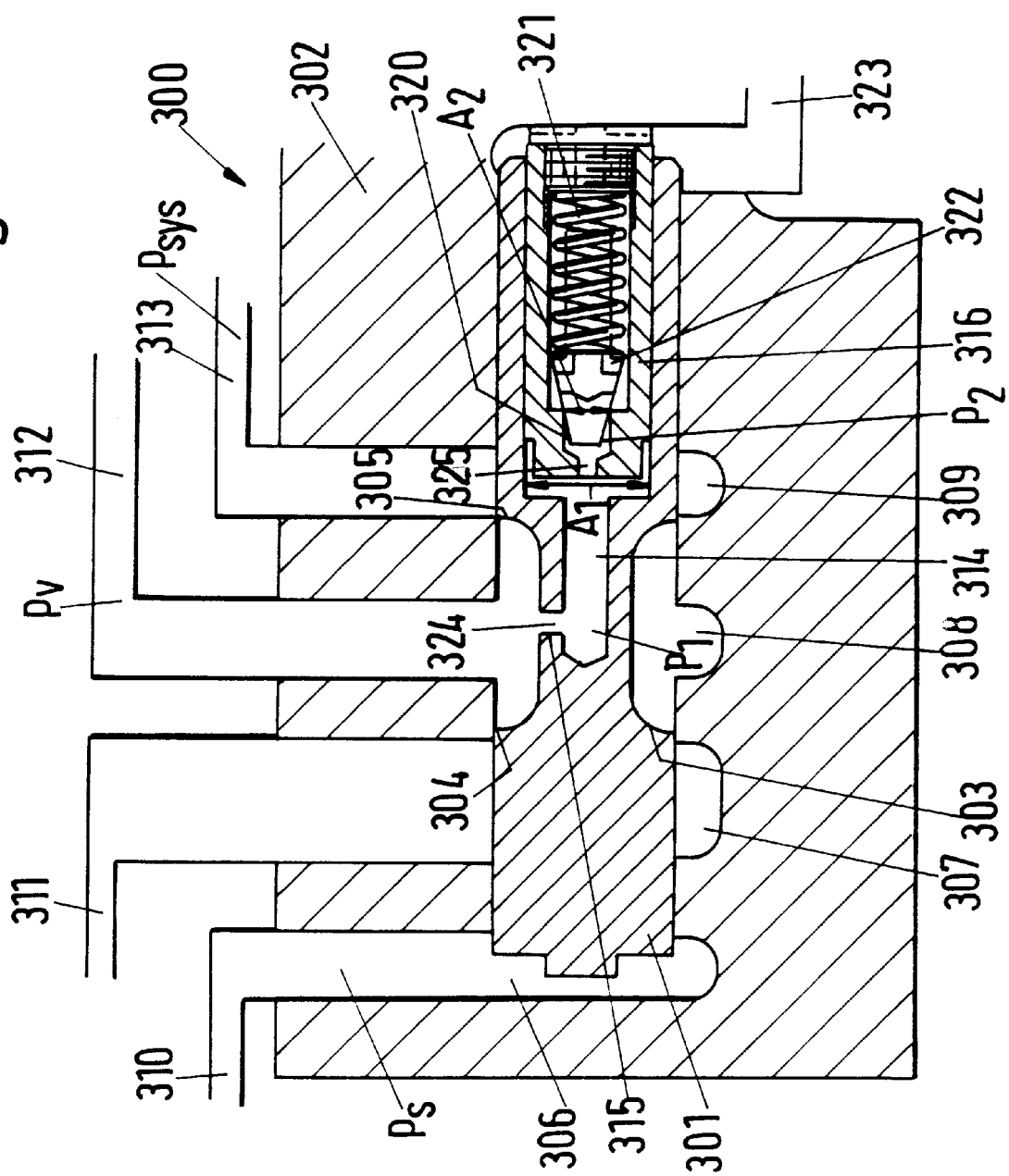

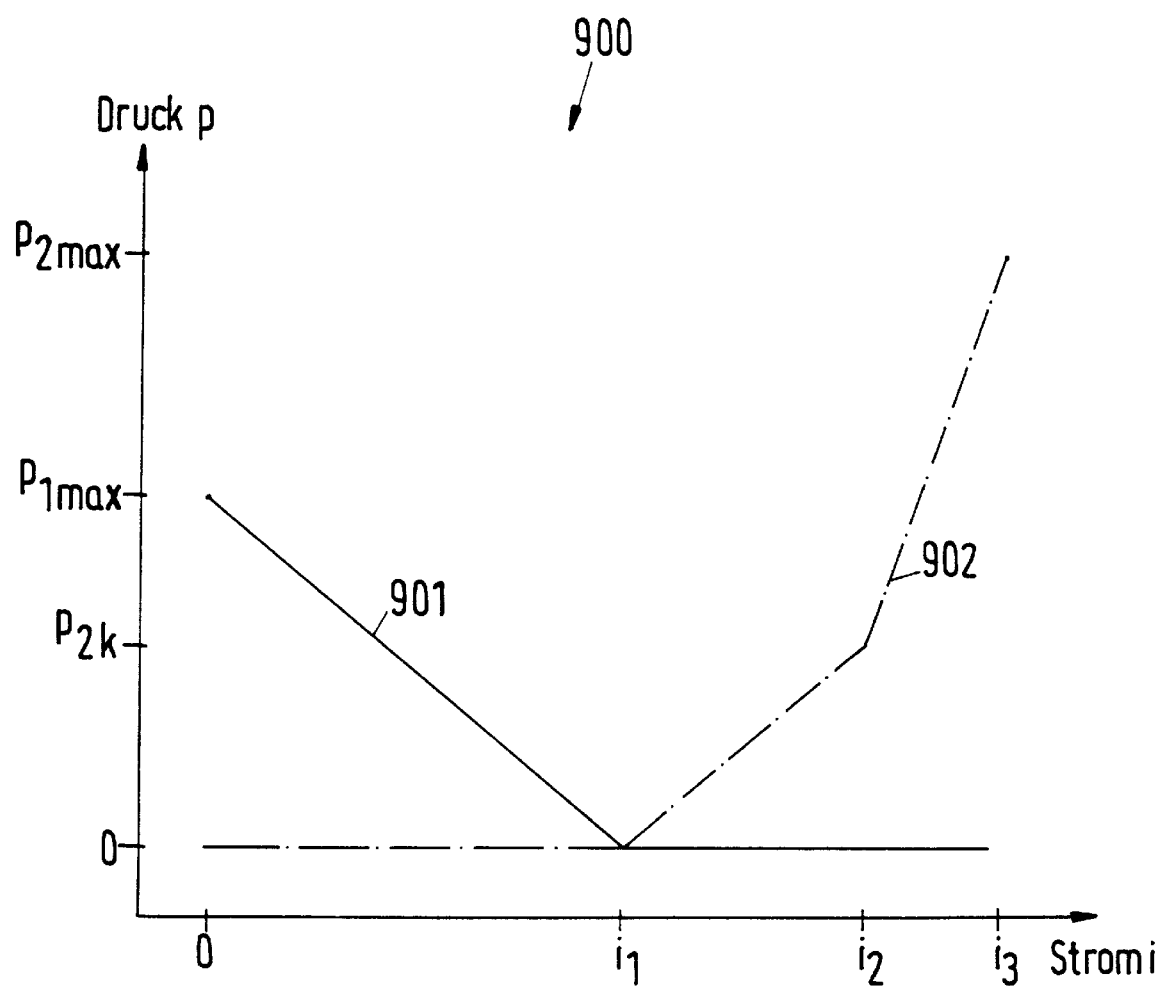

5,924,539

FLUID-OPERATED APPARATUS FOR OPERATING ADJUSTABLE CONSTITUENTS OF MOTOR VEHICLES

BACKGROUND OF THE INVENTION

The invention relates to fluid-operated apparatus or systems which can be utilized in motor vehicles, for example, to actuate or operate one or more consumers of pressurized fluid such as a torque transmitting unit (e.g., a friction clutch or a hydrokinetic torque converter with a bypass or lockup clutch), a transmission (e.g., an infinitely variable transmission with adjustable sheaves or pulleys and an endless flexible element trained around them), one or more cylinder and piston units, and/or others.

More particularly, the invention relates to improvements in fluid-operated systems of the type wherein one or more pumps and/or other suitable machines or units serve to pressurize a hydraulic or pneumatic fluid and the thus pressurized fluid is conveyed along one or more paths which lead toward one or more consumers or users or processors of pressurized fluid and wherein the pressure of fluid is or can be regulated, e.g., reduced, to assume an optimum value for utilization by or in the consumer or consumers.

It is often advisable or desirable to actuate (partly or fully engage or disengage) a friction clutch in the power train of a motor vehicle by resorting to a fluid-operated actor which can actuate the clutch in response to one or more signals transmitted by one or more switches, sensors, circuits and/or other monitoring devices serving to generate signals which denote certain variables or parameters such as the RPM of the engine, the selected gear of the transmission, the extent of depression of the gas pedal, the application or lack of application of one or more brakes and/or others. If the fluid-operated consumer is a clutch, it is necessary to ensure satisfactory operation of the clutch within a wide or even very wide range of torques which the clutch is called upon to transmit, e.g., from the rotary output element of an internal combustion engine or another suitable prime mover to the rotary input element of the transmission in the power train of the motor vehicle.

As a rule, a motor vehicle is operated in such a way that the clutch must transmit torque within a lower range of torques. However, the clutch should also be capable of operating satisfactorily when the torque being transmitted by the prime mover to the clutch is well in excess of the range of average engine torques, i.e., when the clutch is to transmit torque well in excess of a torque within the aforementioned lower range. It has been found that the lower range normally constitutes a greater (and often by far the major part) of the entire gamut of clutch torques between zero and a maximum value. It has also been ascertained that, in the case of single-stage systems which operate with a pressurized fluid and employ a regulating valve in the path for the flow of a pressurized fluid from the fluid pressurizing unit(s) to the consumer(s) of pressurized fluid, one can achieve or at least approach a required or an acceptable resolution or sensitivity or accuracy of adjustment or regulation within the entire operating range in spite of fluctuations or variations of the frequency of operation within certain sections or regions of the operating range. However, there still remains room for pronounced improvements which are desirable to enhance the comfort to the occupant(s) of the motor vehicle and contribute to smoother and more convenient operation or manipulation of the vehicle.

OBJECTS OF THE INVENTION

An object of the invention is to provide a motor vehicle with a novel and improved fluid-operated system or apparatus which can regulate the pressure of a hydraulic or pneumatic fluid being conveyed from one or more fluid pressurizing units (e.g., pumps) to one or more consumers of pressurized fluid (such as a clutch or a transmission) in a novel and improved way.

Another object of the invention is to provide a system which can operate in a highly satisfactory manner within the entire range of operations of one or more consumers of a pressurized hydraulic or pneumatic fluid.

A further object of the invention is to provide a motor vehicle which employs the above outlined fluid-operated system and provides a greater comfort to the occupant(s) during each stage of operation than the known vehicles which employ conventional fluid-operated systems for the actuation of clutches, for the shifting of transmissions and/or for the manipulation of other consumers of pressurized fluid.

An additional object of the invention is to provide a fluid-operated system which ensures a highly satisfactory transmission of torque by a fluid-operated clutch or another torque transmitting device irrespective of the magnitude of the torque which such device receives from a prime mover and/or which such device transmits to a transmission, to a differential or to another driven component or constituent of a motor vehicle.

Still another object of the invention is to provide a relatively simple, compact and inexpensive fluid-operated system which can be utilized with or which can embody available fluid pressurizing units and/or available consumers or users of pressurized pneumatic or hydraulic fluid (e.g., oil).

A further object of the invention is to provide a fluid-operated system or apparatus of the above outlined character which is more versatile than heretofore known and used fluid-operated systems for use in motor vehicles.

Another object of the invention is to provide the above outlined fluid-operated system with novel and improved means for influencing the pressure of a hydraulic or pneumatic fluid in one or more paths for the conveying of a pressurized fluid from one or more fluid pressurizing units to one or more consumers of pressurized fluid in an automobile, a truck or another motor vehicle.

An additional object of the invention is to provide novel and improved combinations or blocks of valves for use in the above outlined system.

Still another object of the invention is to provide a motor vehicle which embodies one or more fluid-operated systems of the above outlined character.

A further object of the invention is to provide a power train wherein at least one constituent cooperates with or forms part of the above outlined fluid-operated system.

Another object of the invention is to provide one or more consumers of pressurized fluid which receive such fluid in accordance with a method forming part of the present invention.

An additional object of the invention is to provide a novel and improved mode of grouping various ranges of fluid pressures and of establishing transitions between such ranges.

SUMMARY OF THE INVENTION

One feature of the invention resides in the provision of a fluid-operated system for use in a motor vehicle. The improved system comprises at least one fluid pressurizing unit (e.g., one or more hydraulic pumps, accumulators and/or others), at least one consumer of pressurized fluid (e.g., a torque transmitting unit, a transmission, one or more cylinder and piston units and/or others), and means for influencing the pressure of fluid in at least one path leading from the at least one unit to the at least one consumer as a function of at least one predetermined or predeterminable variable or parameter (such as system pressure and/or control pressure). The means for influencing includes pressure regulating means serving to impart to the fluid in the path a plurality of different pressures.

The pressure regulating means can include means for imparting to the fluid a first pressure and for imparting to the fluid a second pressure with an abrupt or with a gradual or substantially gradual transition between the first and second pressures.

The pressure regulating means preferably comprises one or more valves. For example, the pressure regulating means can include a first or primary valve and an auxiliary second valve. It is also advisable to provide in the at least one path at least one fluid flow restrictor (throttle). For example, the at least one flow restrictor can be installed upstream of the second valve as seen in the direction of fluid flow to the second valve.

The first valve can comprise a housing or body and a mobile valving element (such as an elongated piston or plunger) which is disposed in the housing and is being acted upon by fluid which is pressurized by the at least one pressurizing unit. The second valve can include means for varying the effective area of at least one surface of the valving element which is being acted upon by pressurized fluid or for varying the pressure of fluid acting upon such surface, e.g., by varying the rate of flow of pressurized fluid from the at least one pressurizing unit against the mobile valving element of the first valve.

The second valve can constitute an on-off valve, i.e., a valve which can be caused to assume an open or a closed position or condition. The arrangement can be such that the pressure of fluid upon the mobile valving element decreases in response to opening of the second valve.

The valving element of the first valve can be installed in the housing for reciprocatory movement in first and second directions, and the first valve can comprise means for biasing the valving element in the first direction. The pressure regulating means of such system preferably further comprises control means for directing against the valving element a pressurized fluid at a variable pressure (control pressure) to urge the valving element in the second direction.

Another feature of the invention resides in the provision of a fluid-operated system for use in a motor vehicle. The system comprises at least one fluid pressurizing unit, at least one consumer of pressurized fluid, and means for influencing the pressure of fluid in at least one path from the at least one unit to the at least one consumer as a function of at least one preselectable variable (e.g., a variable which can be selected by a control unit in conjunction with one or more mechanical, hydraulic, pneumatic, magnetic, electromotoric or other suitable actors or actuators). The pressure influencing means includes pressure regulating means for imparting to the fluid in the at least one path a first pressure within a first range of varying pressures as a first function of the at least one variable, and a second pressure within a second range of varying pressures as a different second function of the at least one variable (e.g., control pressure or current or system pressure).

The fluid is or can be a hydraulic fluid (such as oil), and the at least one pressurizing unit can include at least one pump and/or at least one accumulator.

The first pressures within the first range can vary at a rate which is less pronounced or more pronounced than the variation of second pressures within the second range.

The pressure regulating means can include means for imparting to the fluid a series of first pressures within the first range and for thereupon imparting to the fluid a series of second pressures within the second range with an abrupt or with a more or less gradual transition from the first range.

The pressure regulating means can comprise a plurality of valves (e.g., a first or primary valve and an auxiliary second valve). Such valves can be constructed and assembled and can cooperate with each other in a manner as outlined hereinbefore. Furthermore, one or more flow restrictors can be provided in the at least one path, and such flow restrictor(s) can form part of the first valve and/or second valve or is or are installed in the at least one path upstream and/or downstream of the first and/or second valve.

A further feature of the invention resides in the provision of a fluid-operated system for use in a motor vehicle. This system comprises at least one fluid pressurizing unit, at least one consumer of pressurized fluid, and means for influencing the pressure of fluid in at least one path from the at least one unit to the at least one consumer as a function of at least one predeterminable variable. The pressure influencing means includes a first valve comprising a housing having a first chamber for receiving fluid from the at least one unit, a second chamber for supplying fluid to the at least one consumer, and a third chamber having a fluid-discharging outlet. The first valve further comprises a valving element which is movable in the housing to establish and terminate communication between selected ones of the aforementioned chambers, and the influencing means further comprises a second valve which is disposed in the at least one path between the second chamber and the at least one consumer and is arranged to regulate the flow of fluid to the at least one consumer as a function of fluid pressure in one of the first and second chambers.

The at least one unit can include at least one pump and/or at least one accumulator, and the fluid is or can be a hydraulic fluid.

At least one flow restrictor can be provided in the at least one path, e.g., between the second chamber and the at least one consumer.

The second valve can include or constitute an on-off valve or a directional control valve, and the second valve can be disposed—at least in part—in the valving element of the first valve. The arrangement can be such that the valving element of the first valve comprises a first piston which is reciprocable in its housing, and that the second valve comprises a second reciprocable piston which is coaxial with or is reciprocable in or outside of the first piston in at least substantial parallelism with the axis of the first piston.

The at least one flow restrictor can be installed in a conduit which conveys fluid to the second valve.

The valving element of the first valve is movable in its housing under the action of pressurized fluid in the first chamber, and the second valve can include means for varying the effective area of a surface of the valving element which is being acted upon by pressurized fluid or for varying the pressure of fluid which acts upon such surface. Also, the second valve can be designed to vary the rate of flow of pressurized fluid from the at least one pressurizing unit against the valving element of the first valve. As already mentioned above, the second valve can be constructed, assembled and installed in such a way that it must be opened in order to effect a reduction of fluid pressure upon the valving element of the first valve.

If the valving element of the first valve is or resembles a piston which is reciprocable in the housing in first and second directions, the first valve preferably further comprises one or more coil springs and/or other suitable means for biasing the valving element in the first direction, and the influencing means then further comprises control means for directing against the valving element pressurized fluid at a variable control pressure to urge the valving element in the second direction.

Still another feature of the instant invention resides in the provision of a fluid-operated system for use in a motor vehicle. The system comprises at least one fluid pressurizing unit (e.g., at least one hydraulic pump or accumulator), at least one consumer of pressurized fluid, and means for influencing the pressure of fluid in at least one path leading from the at least one unit to the at least one consumer. The influencing takes place in dependency upon at least one predeterminable variable. The influencing means includes a first valve comprising a body or housing having a first chamber for receiving fluid from the at least one unit, a second chamber for supplying fluid to the at least one consumer, and a third chamber having a fluid discharging outlet. The first valve further comprises a piston which is reciprocable axially in the housing in first and second directions and has different first and second surfaces (e.g., in the form of annular shoulders) arranged to be acted upon by pressurized fluid in a compartment of the housing in such a way that the fluid acting upon the first surface tends to move the piston in the first direction with a first force which is a function of fluid pressure in the compartment, and that the fluid acting upon the second surface tends to move the piston in the second direction with a second force which is a function of fluid pressure in the compartment. The piston is movable relative to the housing to establish and terminate communication between selected chambers, and the means for influencing further comprises a second valve which is arranged to vary the pressure of fluid in the compartment of the housing of the first valve and hence the magnitudes of the aforementioned forces with attendant changes of the extent of movement of the piston.

The surfaces of the piston have different areas, and the extent of movement of the piston relative to its housing or body depends upon the difference between the first and second forces at a given fluid pressure in the compartment.

The at least one consumer can comprise one or more cylinder and piston units (e.g., in an infinitely variable transmission), at least one torque transmitting arrangement (such as a friction clutch or a hydrokinetic torque converter with a lockup or bypass clutch), at least one transmission (such as the aforementioned infinitely or continuously variable transmission) and/or others.

At least a portion of the second valve can be installed in the piston of the first valve, e.g., the second valve can comprise a second piston which is coaxial with and is reciprocable within the piston of the first valve. However, it is also possible to install the second valve in the housing (but not in the piston) of the first valve or outside of the housing of the first valve. The second valve can comprise a valving element which is movable at least substantially at right angles to the directions of movement of the piston in the housing of the first valve.

The second valve can constitute a relatively simple check valve with a spherical or otherwise configured valving element which is biased by one or more springs to normally seal an orifice constituting an inlet for admission of fluid into the housing or body of the second valve.

The influencing means can further comprise at least one flow restrictor in at least one of a connection between the compartment in the housing of the first valve and the second valve, and a connection between the housing of the first valve and the at least one consumer. Furthermore, at least one fluid pressure reducing flow restrictor can be disposed between at least one of the valving element of the second valve and the compartment of the housing of the first valve, and the valving element of the second valve and a connection to the at least one consumer. The at least one path can be provided with several flow restrictors, for example, with two flow restrictors which exhibit at least substantially identical or different fluid flow restricting characteristics.

The second valve can include or constitute an on-off valve or a directional control valve.

As already mentioned before, the valving elements of the first and second valves can constitute pistons which are coaxial or parallel to each other or normal to each other.

The novel features which are considered as characteristic of the invention are set forth in particular in the appended claims. The improved fluid-operated system itself, however, both as to its construction, the mode of installing it in a motor vehicle and its mode of operation, together with additional important and advantageous novel features thereof, will be best understood upon perusal of the following detailed description of certain presently preferred specific embodiments with reference to the accompanying drawings.

BRIEF DESCRIPTION OF THE DRAWINGS

FIG. 2b is a coordinate system wherein a curve denotes the relationship between consumer pressure and a variable when one utilizes the system of FIG. 2a;

FIG. 2c is a view similar to that of FIG. 2a but showing a portion of a system constituting a modification of the system of FIG. 2a;

FIG. 3 is a fragmentary sectional view of two valves in a further modification of a fluid-operated system embodying the present invention;

FIG. 10 is a coordinate system wherein the curves indicate variations of consumer pressures if one employs the fluid-operated system shown in FIGS. 8 and 9.

DESCRIPTION OF PREFERRED EMBODIMENTS

Figure 1:
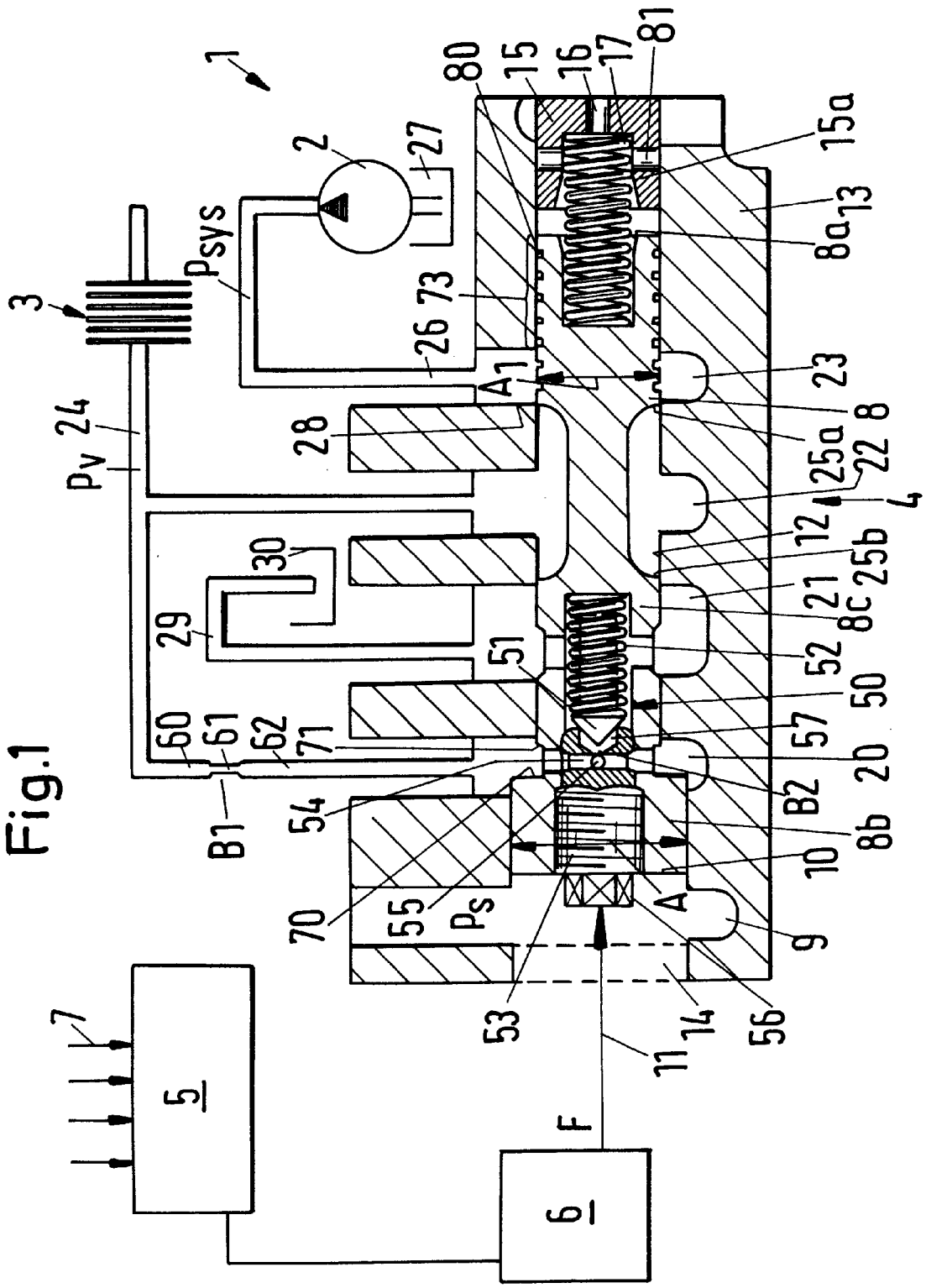
FIG. 1 is a partly diagrammatic and partly sectional view of a fluid-operated system which embodies one form of the present invention and wherein the fluid pressure influencing means comprises two valves one of which is confined in the valving element of the other valve.
Figure 7:
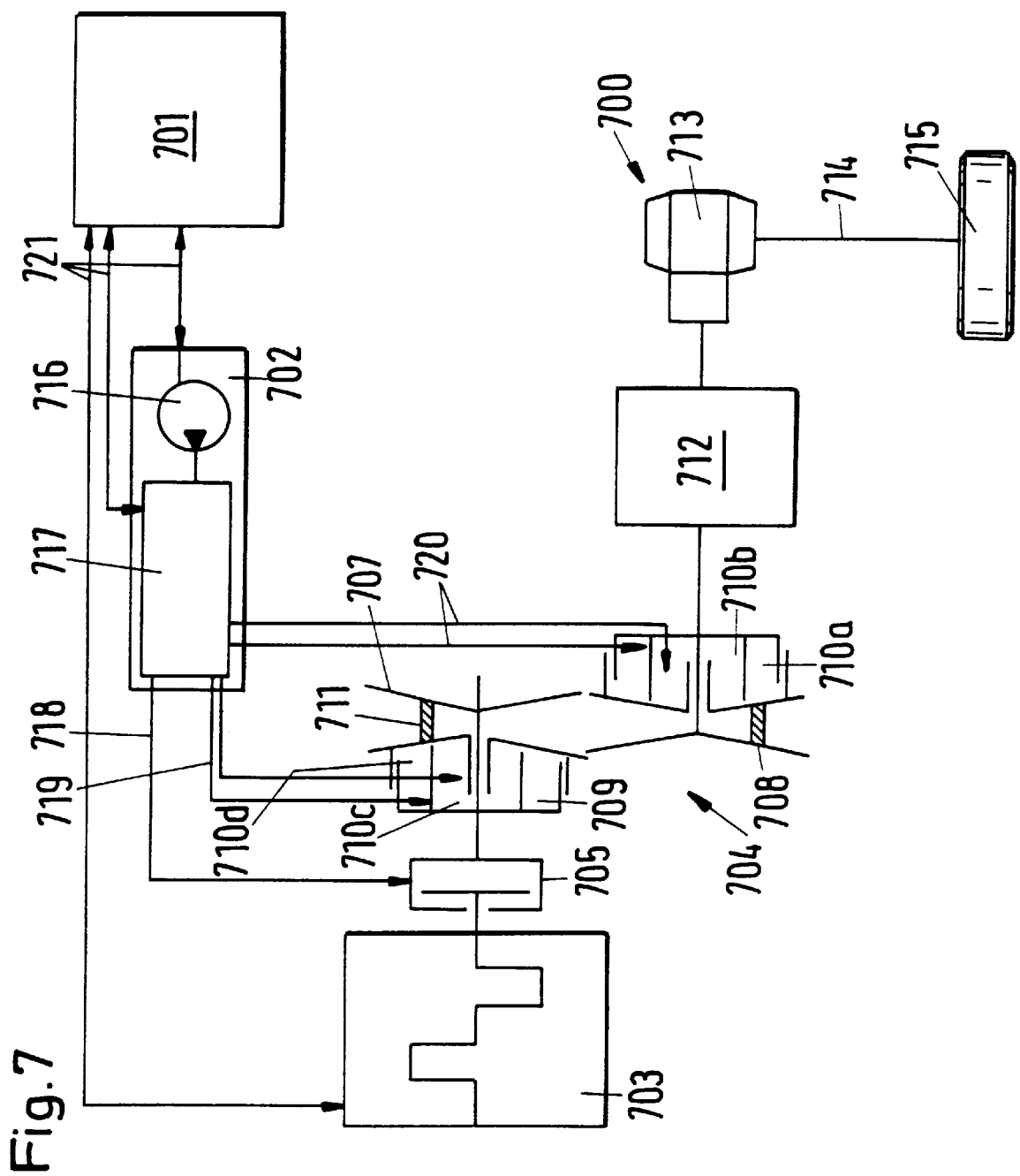
FIG. 7 is a fragmentary diagrammatic plan view of certain component parts of a motor vehicle wherein the improved system is utilized to supply fluid at a selected consumer pressure to an infinitely variable transmission and to a friction clutch.

FIG. 1 shows certain component parts of a fluid-operated apparatus or system 1 which can be utilized in a motor vehicle (a portion of a vehicle is shown in FIG. 7, as at 700) and includes a fluid pressurizing unit 2 (e.g., an oil pump) and a consumer or user 3 of pressurized fluid. The consumer 3 can include or constitute a torque transmitting system (such as a friction clutch or a hydrokinetic torque converter with a bypass or lockup clutch), or a transmission (e.g., an infinitely variable transmission with several adjustable pulleys or sheaves and an endless flexible element (belt or chain) trained around them). Transmissions of such type (also called variators) are described and shown, for example, in commonly owned U.S. Pat. No. 5,135,091 granted Aug. 4, 1992 to Albers et al. for "Apparatus for operating clutches in motor vehicles", and in commonly owned U.S. Pat. No. 5,169,365 granted Dec. 8, 1992 to Friedmann for "Power train". The patent to Friedmann discloses a transmission with two clutches one of which is engaged when the vehicle is to move forwardly and the other of which is engaged when the vehicle is to move rearwardly. Hydrokinetic torque converters are disclosed, for example, in commonly owned U.S. Pat. No. 5,377,796 granted Jan. 3, 1995 to Friedmann et al. for "Apparatus for transmitting force between rotary driving and driven units". Friction clutches are disclosed, for example, in commonly owned U.S. Pat. No. 4,989,710 granted Feb. 5, 1991 to Reik et al. for "Torque transmitting and torsion damping apparatus for use in motor vehicles". The disclosures of the above enumerated patents are incorporated herein by reference.

Though FIG. 1 shows a system 1 which operates with a hydraulic fluid, it is also possible to design the system for operation with compressed air or another suitable pneumatic fluid. Furthermore, the consumer 3 need not necessarily be a component of a power train in a motor vehicle; however, one of the presently preferred uses of the consumer 3 is in such power trains, e.g., to transmit a selected torque between the combustion engine or another prime mover and a manual or automated transmission in the power train of a motor vehicle. The illustrated consumer 3 is assumed to constitute a so-called wet running disc clutch.

The pressure of fluid in the path for the flow of pressurized fluid from the unit 2 to the consumer 3 is influenced, as a function of at least one variable or parameter ($p_s$) by a system of pressure- and flow-regulating valves including a first or primary regulating or control valve 4 and a second or secondary valve 50. The path for the flow of pressurized fluid from the unit 2 to the consumer 3 is defined in part by the housing or body 13 of the first or primary valve 4 and in part by several conduits including a conduit 26 which conveys pressurized fluid at system pressure ($p_{sys}$) from the outlet of the unit 2 (such as the aforementioned oil pump) to an inlet port of the housing 13, and a conduit 24 which conveys fluid at consumer pressure $p_v$ from an outlet port of the housing 13 to the consumer (clutch) 3.

The system or apparatus 1 further comprises or cooperates with a control unit 5 (e.g., an electronic circuit) having several inputs receiving various signals from several sensors (not specifically shown in FIG. 1) via conductors 7. The operation of the primary valve 4 is controlled by a suitable actor or actuator 6 which receives signals from an output of the control unit 5. The latter evaluates, analyzes and processes the signals which are transmitted thereto via one or more conductors 7 and transmits commensurate output signals to the actor 6 which applies to the axially reciprocable valving element or piston 8 a variable force serving to determine the axial position of the piston 8 and hence the characteristics of pressurized fluid flowing from the housing 13 to the consumer 3 via conduit 24. At least one of the conductors 7 can constitute a data bus, and the means which transmit signals to the control unit 5 via conductors 7 (or by way of additional conductors, not shown) can include one or more switches, sensors, electronic or other circuits and/or other signal generating and transmitting components of a motor vehicle.

The force transmitting connection between the actor 6 and the piston 8 of the primary valve 4 can constitute a pneumatic, hydraulic, magnetic, electromagnetic, mechanical or any other suitable arrangement (e.g., an electric motor). Such connection is denoted by the arrow 11. In other words, the piston 8 can constitute a mechanically, hydraulically pneumatically, magnetically, electromagnetically or eletromotorically actuated valving element which establishes or terminates or varies (increases or reduces) the flow of fluid into, from and within the housing 13 of the primary valve 4.

The piston 8 is assumed to be shiftable in response to the action of a hydraulic fluid which fills a chamber 9 of the housing 13 and the pressure $p_s$ of which is variable to exert a corresponding force upon the end surface 10 of the piston 8. Such force is opposed in part by the bias of a valve spring 17 (e.g., a coil spring) which reacts against a stopper or plug 15 of the primary valve 4 and bears upon the bottom surface in a recess or socket 8a provided therefor in the right-hand end face of the piston 8.

The piston 8 is reciprocable in an elongated bore or hole 12 of the housing 13, and the right-hand end of this bore receives the aforementioned stopper or plug 15. The latter has an external thread mating with an internal thread of the housing 13; this renders it possible to select and/or to adjust the bias of the spring 17 by rotating the plug relative to the housing. The illustrated plug 15 is further provided with an axially extending outlet port 16 for leak fluid and with a recess or socket 15a for several right-hand convolutions of the spring 15. The outlet port 16 is optional.

The left-hand end of the bore 12 in the housing 13 is sealed by a wall 14.

The piston 8 includes a larger-diameter (A) section or portion 8b at the end face or surface 10, and a smaller-diameter (A1) section or portion 8c extending from the section 8b all the way to the open end of the socket 8a.

The bore 12 communicates or can communicate with several preferably substantially annular recesses or chambers 20, 22, 23 and with a preferably substantially annular compartment 21, all machined into or otherwise formed in the surface bounding the bore 12. The chamber 23 communicates with the conduit 26 and supplies fluid at system pressure $p_{sys}$ from the outlet of the unit 2. The chamber 20 communicates or can communicate with the conduit 24 to deliver for the consumer 3 pressurized fluid at a selected (optimum) consumer pressure $p_v$. The pressure $p_v$ is influenced by a variable, for example, by the control pressure $p_s$ prevailing in the chamber 9 and determined by the actor 6 in response to an output signal from the control unit 5.

The chamber 21 has an outlet 29, such as a conduit serving to convey spent fluid to a collecting device 30, e.g., to a sump.

The piston 8 is provided with annular control edges or shoulders 25a, 25b which are acted upon by fluid in the compartment 22. The shoulders 25a, 25b are disposed at the two axial ends of a smaller-diameter portion or neck of the piston 8; the axial length of this neck (i.e., the axial distance between the shoulders 25a, 25b) is shown as being several times the axial length of the compartment 22.

Depending on its momentary axial position, the piston 8 can establish communication between the chamber 21 and the compartment 22 or between the compartment 22 and the chamber 23. FIG. 1 further shows a fluid source 27 (e.g., a tank) which supplies fluid (e.g., oil) to the unit (pump) 2, and the pressure of fluid being drawn from the source 27 is raised to system pressure $p_{sys}$ which prevails in the conduit 26 and in the chamber 23.

The unit 2 need not necessarily constitute a pump, i.e., a fluid pressurizing machine. For example, it is equally possible to employ a fluid pressurizing unit in the form of an accumulator which is connectable with the conduit 26 by a suitable valve to supply into the chamber 23 a fluid at system pressure $p_{sys}$. A valve can also be installed in the conduit 26 between the illustrated unit 2 and the chamber 23.

When the piston 8 is caused to move toward the plug 15, the shoulder 25a of the piston moves beyond an internal control edge or shoulder 28 of the valve body or housing 13 to thus establish a passage for the flow of fluid between the chamber 23 and the compartment 22. Such axial movement of the piston 8 takes place against the opposition of the spring 15 (i.e., this spring stores energy or additional energy) and the fluid pressure in the compartment 22 then establishes or determines the consumer pressure $p_v$ in the conduit 24 leading to the consumer 3. The fluid at the pressure $p_v$ can serve to initiate a partial or full engagement or disengagement of the consumer 3 if the latter constitutes or includes or forms part of a torque transmitting system such as a friction clutch or a hydrokinetic torque converter with a bypass or lockup clutch.

If the piston 8 is shifted in the opposite direction (i.e., away from the plug 15), the communication between the chamber 23 and the compartment 22 is interrupted and the compartment 22 establishes direct communication between the conduit 24 and the outlet conduit 29 leading from the chamber 21 to the sump 30. Thus, the consumer pressure $p_v$ is or can be reduced by the simple expedient of enabling the spring 17 to shift the piston 8 in proper direction and through a requisite distance.

The selection of a regulating signal by the control unit 5 and the selection of a corresponding piston-shifting force (F) by the actor 6 render it possible to achieve planned, purposeful or concerted changes in the axial position of the piston 8 in order to select in the conduit 24 a consumer pressure $p_v$ which is properly related to (i.e., a satisfactory function of) the selected variable (in the embodiment of FIG. 1, the variable is the fluid pressure $p_s$ acting in the chamber 9 upon the end face or surface 10 of the piston 8).

In order to ensure the establishment of a two-stage characteristic curve (this curve will be discussed with reference to FIG. 2) denoting the consumer pressure $p_v$ as a function of a variable, such as the control pressure $p_s$, the means for influencing the pressure of fluid in the path portion defined by the conduit 24 (i.e., in the consumer 3) includes a regulating means which, in addition to the primary valve 4, further comprises the aforementioned second or secondary valve 50. As can be seen in FIG. 1, at least a major portion of the valve 50 is installed in the valving element or piston 8 of the primary valve 4.

The second valve 50 comprises a valving element in the form of a piston or plunger 51 which is coaxial with and is reciprocable in a bore of the piston 8. A coil spring 52 of the valve 50 serves to bias the plunger 51 in a direction to the left, as viewed in FIG. 1, toward an externally threaded stopper or plug 53 in the bore of the piston 8. The plug 53 has substantially radially extending channels 54 which can establish communication between the chambers 20, 21 by way of a fluid-discharging orifice 55 constituting a flow restrictor B2. The orifice 55 allows fluid to flow from the chamber 20 into the chamber 21 (and thence into the sump 30 via outlet 29) when the second valve 50 is open (off). For example, the plug 53 can be provided with a cruciform or with a star-shaped array of channels 54 which have or which can have circular cross-sections and extend radially outwardly from the orifice 55 to supply fluid (at pressure $p_v$) from the conduit 24 to the orifice 55 (flow restrictor B2) which communicates with the chamber 21 when the second valve is at least partially open.

The stopper or plug 53 has a hexagonal (or other non-circular) head 56 which is accessible in the chamber 9 to permit the introduction of the externally threaded plug 53 into or its extraction from the open end of the bore for the plunger 51 and spring 52 of the second valve 50. Other types of fixed or adjustable connections between the piston 8 and the plug 53 can be resorted to with equal or similar advantage.

When the second valve is closed (on), the fluid pressure in a plenum chamber or region 57 between the orifice 55 and the adjacent side of the plunger 51 is insufficient to cause the plunger 51 to move to the right, i.e., against the opposition of the coil spring 52. At such time, the magnitude of the force which acts upon the plunger 51 equals the pressure of fluid in the plenum chamber 57 multiplied by the effective area of the adjacent side or surface of the plunger 51, and such force is insufficient to overcome the bias of the spring 52 which urges the plunger 51 against the plug 53 so that the orifice 55 and the channels 54 are sealed from the chamber 21.

If the consumer pressure $p_v$ in the conduit 24 (and hence in the plenum chamber 57) exceeds a threshold value so that the force acting upon the left-hand side of the plunger 51 overcomes the bias of the spring 52, the valve 50 opens and permits fluid to flow from the conduit 24, through a conduit 60, a throttle 61 (flow restrictor B1), and a conduit 62 into the chamber 20, i.e., into the channels 54 and orifice 55, through the plenum chamber 57, and into the sump 30 via chamber 21 and outlet 29.

The flow restrictors B1 (61) and B2 (55) throttle the flow and reduce the pressure of fluid flowing from the conduit 24 via chambers 20, 21 and into the sump 30.

The pressure of fluid in the chamber 20 depends upon the axial position of the plunger 51 (or vice versa), and such pressure is applied to the plunger 51 in order to counteract or oppose the force which is attributable to the selected variable, such as the control pressure $p_s$.

The axial force which acts upon the plunger 51 at the chamber 20 in addition to the force provided by the bias of the spring 52 and the selected control pressure $p_s$ is attributable to the difference (A–A1) between the diameters A and A1 of the piston sections 8b and 8c multiplied by the fluid pressure in the chamber 20. When the second valve 50 opens, the fluid pressure in the chamber 20 drops and the magnitude of the force which is attributable to the difference between the diameters A and A1 decreases; this entails the development of a different characteristic of the consumer pressure $p_v$ as a function of the selected variable (such as the control pressure $p_s$).

The piston 8 is provided with an annular surface or shoulder 70 which develops due to the difference between the diameters A and A1 of the sections 8b, 8c, and this shoulder 70 faces toward the plug 15. The shoulder 70 is confronted (across the chamber 20) by a much smaller annular shoulder 71 of the piston section 8c. The forces F1 and F2 respectively acting upon the shoulders 70 and 71 are different due to the difference between the fluid-contacted areas of these shoulders, and such forces F1, F2 oppose each other. The resultant of the forces F1, F2 is a function of fluid pressure in the chamber 20, and such resultant force tends to move the piston 8 in a direction to the left, as viewed in FIG. 1, i.e., it tends to assist the bias of the spring 17. When the second valve 50 opens so that the fluid pressure in the chamber 20 decreases, the aforementioned resultant force also decreases because it is a function of fluid pressure in the chamber 20.

The cross-sectional areas of the flow restrictors B1 (61) and B2 (at 57) determine the drop of fluid pressure $p_v$ in the regions between the conduits 60, 62 and at the orifice 55, respectively. Thus, by properly selecting the cross-sectional areas of the flow restrictors B1 and B2, one can select the variations of consumer pressure $p_v$ as a function of a variable (such as $p_s$). The ratio of such cross-sectional areas can vary within a rather wide range, e.g., between 1:10 and 10:1.

That end portion of the piston section 8c which is provided with the recess or socket 8a for certain convolutions of the spring 17 is also provided with a set of circumferentially complete external grooves (or with a helical groove) 72. Such groove or grooves can be filled with a pressurized hydraulic fluid when the pressure regulating means including the valves 4 and 50 is in use. Since the fluid in the chamber 23 is maintained at the system pressure $p_{sys}$ which is determined by the unit 2, and an annular portion 73 of the recess or socket 8a is or can be maintained at atmospheric pressure, the fluid which fills the annular space between the internal surface of the housing 13 around the bore 12 and the external surface of the piston section 8c between the chamber 23 and the annular portion 73 of the socket 8a acts as a lubricant and ensures that the piston 8 actually floats in the bore 12. In other words, the grooves 72 can contribute to a reduction of friction between the housing 13 and the piston 8 when the latter is caused to carry out an axial movement in the bore 12.

Figure 2:
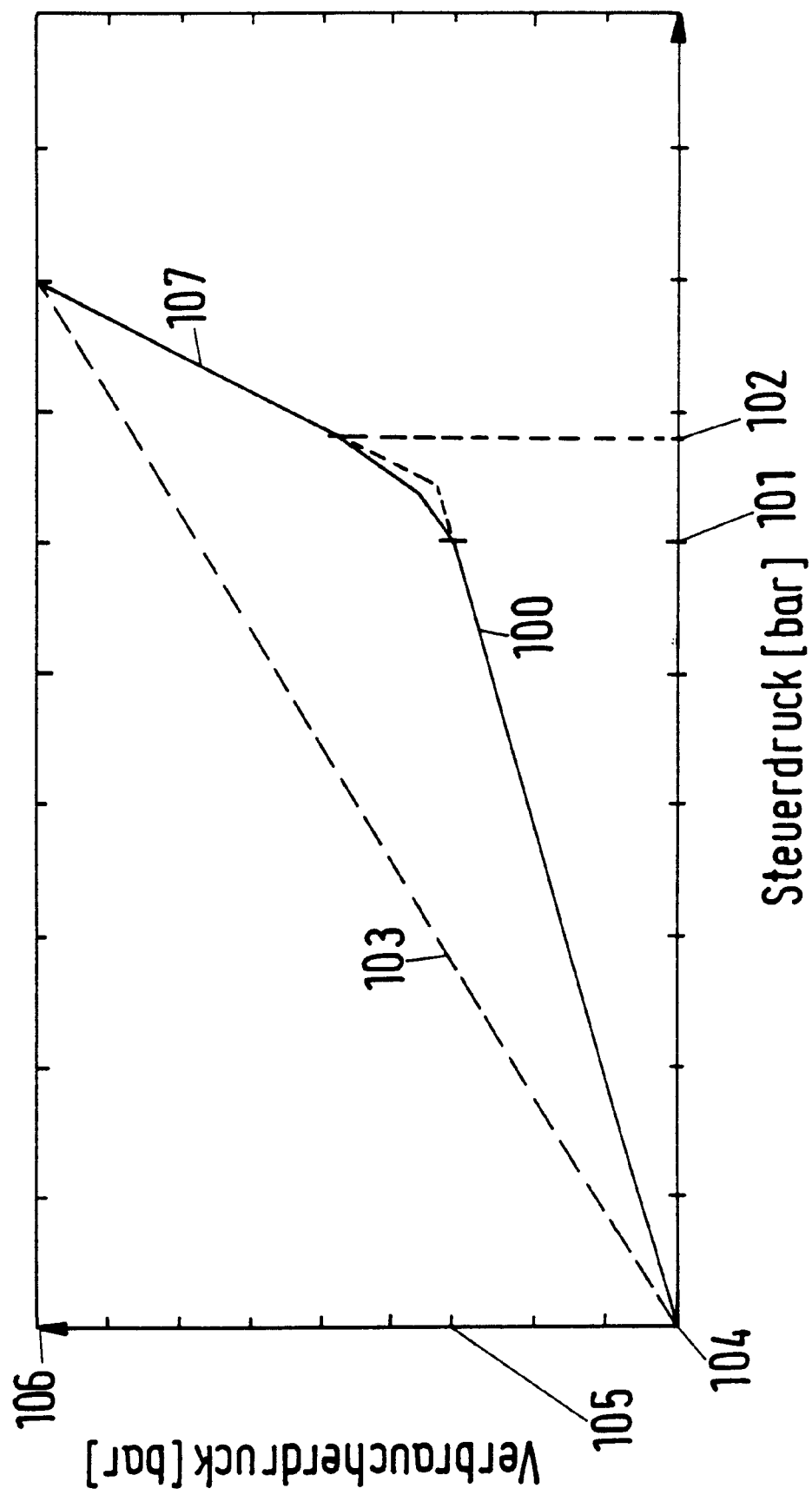
FIG. 2 is a coordinate system wherein a curve indicates the dependency of consumer pressure upon a variable, such as a control pressure of a fluid medium.

FIG. 2 shows a coordinate system wherein the control pressure $p_s$ (in bar) is measured along the abscissa and the consumer pressure $p_v$ (also in bar) is measured along the ordinate. The characteristic curve denoting the variations of consumer pressure $p_v$ as a function of changes of control pressure $p_s$ is represented by a graph including a first portion or section 100 having a first slope, and a second portion or section 107 having a much more pronounced slope. The transition between the sections 100 and 107 is or can be abrupt or gradual (smooth). The curve including the sections 100 and 107 can constitute the characteristic curve of a gamut of consumer pressures $p_v$ which can be applied to actuate a torque transmitting system 3, such as a friction clutch or a hydrokinetic torque converter in the power train of a motor vehicle.

As shown by the section 100 of the characteristic curve, the consumer pressure $p_v$ rises gradually (linearly) to the value 101 of the control pressure $p_s$, and the section 107 indicates that the consumer pressure $p_v$ again increases gradually (linearly) but with a different slope beyond the value 102 of the control pressure $p_s$. The solid-line curve portion 100a indicates a more or less gradual transition from the section 100 to the section 107, and the dotted-line curve portion 100b indicates a more or less abrupt transition.

The broken-line curve 103 indicates a conventional characteristic curve which is linear all the way from the value 104 to the value 106 of the consumer pressure $p_v$, i.e., all the way from the start to the end of the composite curve 100, 100a, 107 or 100, 100b, 107. An advantage of a multi-stage variation of the value of $p_v$ in comparison with that denoted by the curve 103 is that the sensitivity or accuracy of regulation of consumer pressure $p_v$ in the range between the values 104 and 105 is much more satisfactory because the range of control pressures $p_s$ at a given consumer pressure $p_v$ is wider. Furthermore, it is possible to reduce the range of control pressures $p_s$ in the region of the section 107 which, in turn, renders it possible to optimize the normally useful range of control pressures $p_s$ for the normally utilized or resorted-to range of consumer pressures $p_v$ without, however, neglecting the safety functions which are ensured by the increased overall consumer pressure.

The multi-stage (in the illustrated embodiment two-stage) operation of the fluid pressure influencing means including the valves 4 and 50 exhibits the additional advantage that the hysteresis of the composite valve is relatively low. Thus, the multi-stage arrangement and the relatively small slope of the section 100 of the characteristic curve denoting the variations of the consumer pressure $p_v$ render it possible to realize greater forces for adjustment or actuation of the consumer 3 within the zero value and the value 101 of the control pressure $p_s$ to thus compensate for eventual deviations from a predetermined value. Consequently, the hysteresis is relatively low in the region in which the pressure can be modulated with a higher degree of precision.

The range of consumer pressures $p_v$ between the values 104 and 105 in the coordinate system of FIG. 2 is that which corresponds to the range of operation of the consumer, e.g., a hydraulically actuatable clutch 3 in the power train of a motor vehicle. The range between the values 105 and 106 on the ordinate of the coordinate system shown in FIG. 2 can be said to constitute a safety range (reserve) which comes into play under certain circumstances, for example, when the friction coefficient of the clutch has decreased and it is therefore necessary to furnish a higher initial pressure as consumer pressure $p_v$. As a rule, the elevated consumer pressure $p_v$ (above 105 in FIG. 2) is resorted to only in a very low percentage of cases or situations. Therefore, it is desirable to select a characteristic curve with a section 100 whose inclination is relatively low while the consumer pressure $p_v$ varies between 104 and 105, and with a much steeper section 107 above the value 105 of the consumer pressure $p_v$.

Figure 2A:
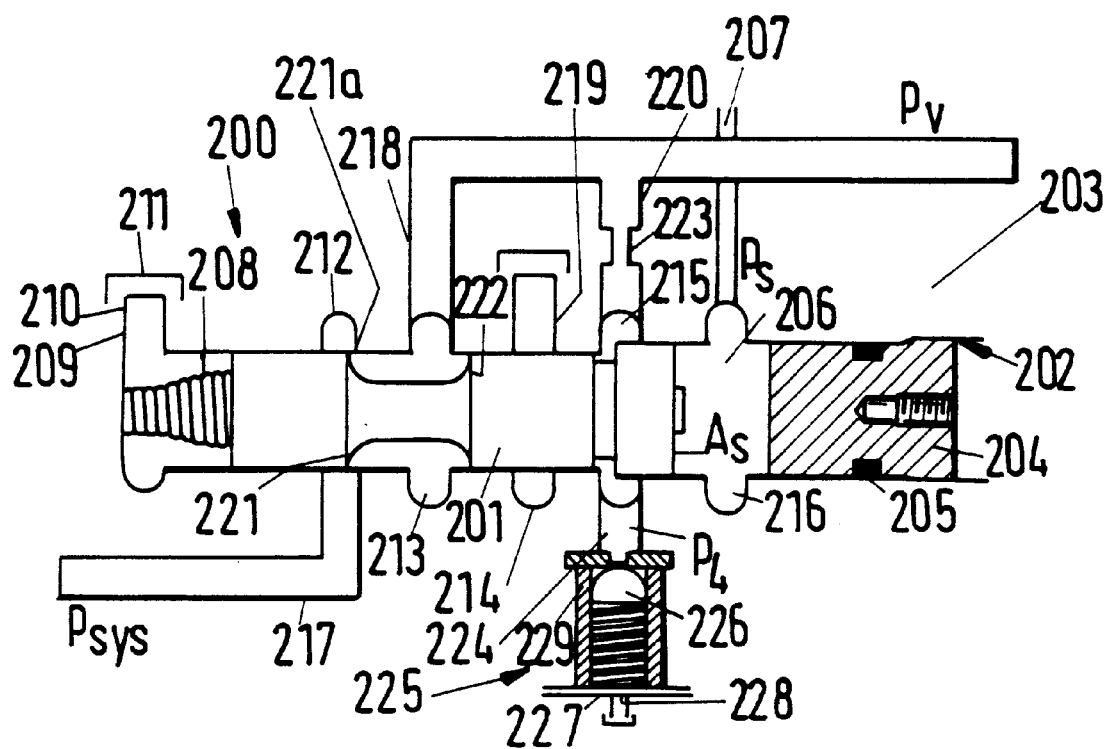
FIG. 2a is a fragmentary partly schematic and partly sectional view of a fluid-operated system which constitutes a first modification of the system shown in FIG. 1 and wherein one of the valves is installed outside of the valving element of the other valve.

FIG. 2a shows a first modification of the system 1 which is illustrated in FIG. 1. The pressure influencing means of the modified system comprises a first or primary valve 200 and a second valve 225. The primary valve 200 comprises a valving element 201 in the form of a piston which is reciprocable in an elongated bore or hole 202 of a valve body or housing 203. The axis of the piston 201 is normal to the directions of movement of a spherical valving element 226 forming part of the second valve 225 which is or which can be disposed outside of the valve housing 203 and is spaced apart from the piston 201. The right-hand end of the bore 202 is sealed by a stopper or plug 204 having a circumferential groove for an O-ring 205 or any other suitable sealing element. Other and/or additional sealing means can be provided, if necessary.

A portion 206 of the bore 202 is connected with a control unit by a conduit 207 wherein the fluid is maintained at a control pressure $p_s$; such fluid exerts pressure against the adjacent end face or surface $A_s$ of the piston 201. The force acting upon the surface $A_s$ equals the fluid pressure $p_s$ multiplied by the effective area of the surface $A_s$.

The other end face of the piston 201 is biased by a valve spring 208, e.g., a coil spring, which urges the piston 201 in a direction toward the plug 204. The housing 203 defines a chamber 209 which receives the spring 208 and is connected, by an outlet 210, with a sump 211 serving to collect leak fluid.

The housing 203 is provided with additional chambers 212, 213, 214, 215 and 216 which respectively communicate with conduits 217, 218, 219, 220 and 207. The conduit 217 supplies fluid (e.g., from a pump or from an accumulator) at system pressure $p_{sys}$, the conduit 218 conveys fluid at a pressure $p_v$ to one or more consumers, the conduit 219 serves as an outlet which connects the chamber 214 with a sump, and the conduit 220 contains a flow restrictor 223 and connects the chamber 215 with the conduit 218, i.e., with consumer(s) of pressurized fluid at pressure $p_v$.

The piston 201 has an annular control edge or shoulder 221 which determines whether or not the chamber 212 can communicate with the chamber 213; when the chambers 212 and 213 are free to communicate with each other, pressurized fluid can flow from the conduit 217 into the conduit 218, i.e., the consumer pressure $p_v$ in the conduit 218 is then a function of the system pressure $p_{sys}$ in the conduit 217 and of the axial position of the piston 201. This axial position of the piston 201, in turn, is a function of the control pressure $p_s$ in the chamber 206. The valve housing 203 has a control edge or shoulder 221a which cooperates with the shoulder 221 to provide a throttling or flow restricting action so that the pressure $p_v$ in the conduit 218 can be less than the pressure $p_{sys}$ in the conduit 217. The pressure of fluid in the conduit 215 is dependent upon the pressure $p_v$; the flow restrictor 223 reduces the pressure in the chamber 215 to a value below that of the pressure $p_v$ in the conduit 218. The connection between the flow restrictor 223 and the conduit 218 includes the further conduit 220.

The chamber 215 is connected with the second valve 225 by a conduit 224. The valve 225 further comprises an energy storing element 227 (such as a coil spring) which biases the valving element 226 against an outlet orifice 229. The latter is sealed from an outlet port 228 when the valve 225 (shown as a check valve) is closed.

The valving element 226 of the second valve 225 is acted upon by a force which is a product of the fluid pressure p in the conduit 224 and the cross-sectional area of the orifice 229. This force must overcome the bias of the spring 227 if the second valve 225 is to open and permit fluid to flow from the chamber 225, through the conduit 224 and the orifice 229, through the outlet 228 and into a sump.

Figure 2B:
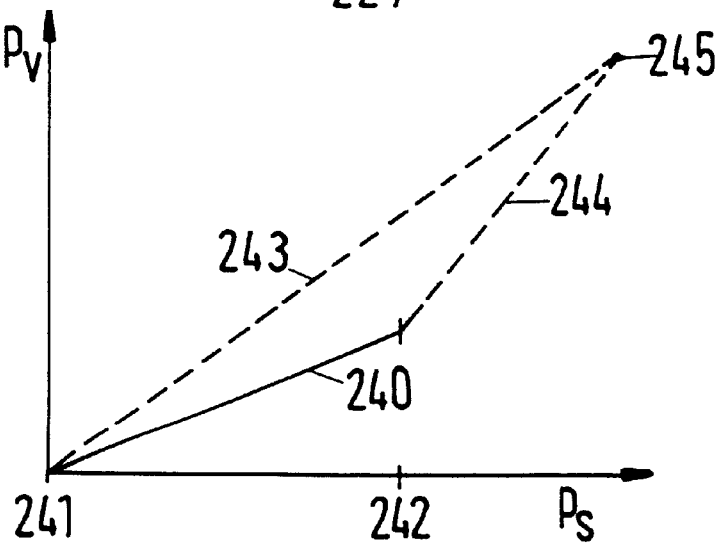

FIG. 2b shows a coordinate system wherein the consumer pressure $p_v$ is measured along the ordinate and the control pressure $p_s$ is measured along the abscissa, the same as in the coordinate system of FIG. 2.

The characteristic curve of $p_v$ in FIG. 2b includes a gradually (linearly) sloping first portion or section 240 and an equally gradually sloping but much steeper second portion or section 244 with an abrupt transition between the sections 240, 244 at the $p_s$ value 242. The second valve 225 remains closed as long as the pressure $p_s$ is between 241 and 242 but opens abruptly when the pressure $p_s$ rises above 242.

The system including the valves 200, 225 of FIG. 2a exhibits advantages which were discussed hereinbefore in connection with FIG. 2. Thus, and as compared with the conventional characteristic curve 243, it is possible to ensure that the slope of the section 240 is much less pronounced than that of the next-following section 244 or of the corresponding section of the curve 243 but the starting and end points (241, 245) can remain unchanged. The range of consumer pressures $p_v$ which are normally selected in actual use of a motor vehicle is that denoted by the section 240, and the pressures $p_v$ within such range can be selected with a much higher degree of accuracy, i.e., within a very wide range (between 241 and 242) of control pressures $p_s$.

Figure 2C:
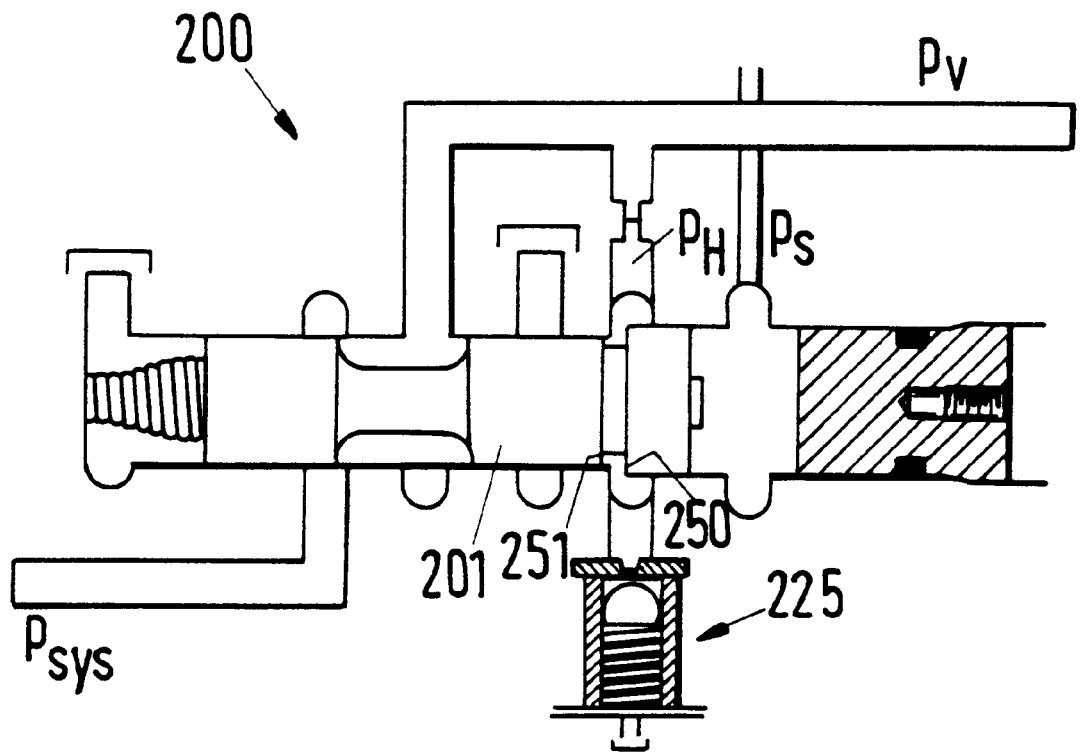
Figure 2D:
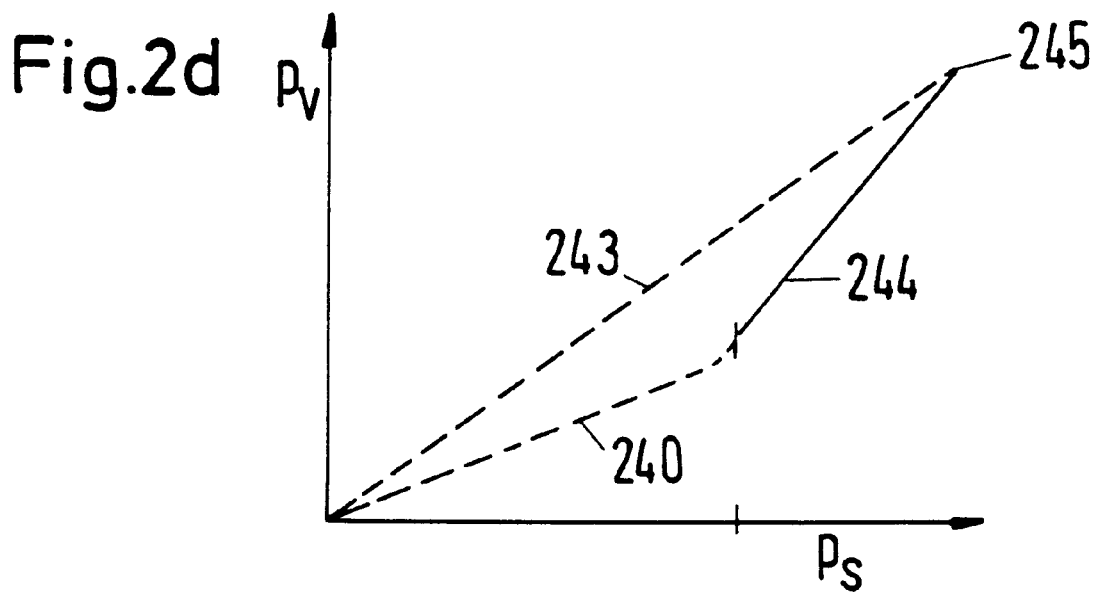
FIG. 2d is a coordinate system wherein a curve denotes the relationship between variations of consumer pressure and a variable when one utilizes the fluid-operated system embodying the structure of FIG. 2c.

FIG. 2c shows a modified combination of the valves 200 and 225. The fluid pressure $p_h$ in the chamber 215 is sufficiently high to effect an opening of the second valve 225. This entails the development of a throttling action at the flow restrictor 223, i.e., the pressure $p_h$ is lower than the consumer pressure $p_v$ in the conduit 218, and the fluid at pressure $p_h$ acts upon the surfaces 250, 251 of the piston 201 and the valve housing 203, respectively. The result is a rise of consumer pressure $p_v$ relative to the system pressure $p_{sys}$ and a steeper incline of the section 240 of the characteristic curve 240, 244 shown in FIG. 2d. The transition between the sections 240, 244 of the characteristic curve shown in FIG. 2d is more gradual than that shown in FIG. 2b. The terminal point 245 of the standard curve 243 coincides with the terminal point of the relatively steep second section 244 of the curve which can be obtained by resorting to the valves 200, 225 of FIG. 2c.

Referring to FIG. 3, there is shown a fluid pressure influencing arrangement including a first or primary valve 300 having a valving element in the form of a piston 301 which is axially reciprocable in a bore of a valve body or housing 302. The peripheral surface of the piston 301 is provided with a circumferentially complete recess or groove 303 extending between axially spaced apart annular edge faces or shoulders 304 and 305. The housing 302 has annular internal chambers 306, 307, 308, 309, and the shoulders 304, 305 cooperate with complementary shoulders at the axial ends of the chambers 307, 308, 309 in response to axial shifting of the piston 301; such cooperation ensures an optimal selection of consumer pressure $p_v$ which is communicated to the consumer(s) via conduit 312 extending from the chamber 308 to a hydraulically operated clutch and/or to another consumer. The control pressure $p_s$ in the chamber 306 is determined by the actor (not shown in FIG. 3) via conduit 310. The chamber 307 is connected with the sump via conduit 311, and the chamber 309 is connected with the fluid pressurizing unit or units by a conduit 313 containing a fluid at system pressure $p_{sys}$.

The axial position of the piston 301 in the bore of the housing 302 can be changed by changing the control pressure $p_s$ in the chamber 306. For example, the pressure $p_s$ in the chamber 306 can be selected in such a way that the piston 301 is caused to assume an axial position in which it establishes communication between the chambers 308, 309 at the shoulder 305. This establishes or alters the consumer pressure $p_v$ in the conduit 312. Since the control pressure $p_s$ in the chamber 306 is known (it is selected by the actor in response to a signal from the control unit, not shown in FIG. 3), the pressure $p_1$ in an axial blind bore 314 of the piston 301 is also known because the bore 314 communicates with the chamber 308 by way of a flow restricting orifice 315 of the piston 301; the pressure $p_1$ then equals $p_v$.

The pressure $p_1$ in the bore 314 causes the generation of a force which urges the piston 301 axially and in a direction to the left, as viewed in FIG. 3. Such force reacts against an axially shiftable piston or plunger 316 which is confined in the bore of the valve housing 302. The plunger 316 can be said to constitute the body or housing of a (second) valve including a valving element 322 having a substantially frustoconical portion normally sealing a plenum chamber 320 and an orifice or flow restrictor 325 when the spring 321 of the second valve is permitted to maintain the valving element 322 in the axial position of FIG. 3.

The force acting upon the valving element 322 in a direction to open the second valve is determined by the fluid pressure $p_2$ in the plenum chamber 320 multiplied by the effective area of the valving element 322 at A2, namely at the locus where the base of the substantially frustoconical portion of the valving element 322 bears against the plunger or housing 316 when the second valve is closed.

When the fluid pressure $p_2$ in the plenum chamber 320 rises above a threshold value, the bias of the valve spring 321 is overcome and the chamber 308 is then free to communicate with an outlet 323 of the second valve via flow restricting orifice 315, bore 314, flow restricting orifice 325, chamber 320 and the path from the chamber 320 to the outlet 323. This causes a change of the pressures $p_1$ and $p_2$ relative to the pressure $p_v$ because the flow restricting orifices 315 and 325 respectively reduce the pressures $p_1$ and $p_2$. If the flow restricting actions or effects of the orifices 315 and 325 are identical, the drop of the pressure $p_1$ is the same as that of the pressure $p_2$.

The plunger or housing 316 can abut the housing 302 of the first valve 300 at its right-hand end, as seen in FIG. 3. However, if the pressure in the outlet 323 is sufficiently high, the plunger 316 can be shifted in a direction to the left, i.e., its right-hand end face then no longer abuts the housing 302. In other words, in order to ensure that the plunger 316 will leave its right-hand end position, it is necessary to raise the pressure at 323 accordingly.

By way of example, if the control pressure $p_s$ (selected by the control unit and applied by the actor) is 12 bar, if the cross-sectional area of the orifice 315 is identical with that of the orifice 325, and if the stressing of the spring 321 divided by the cross-sectional area at A2 equals 6 bar, the pressure $p_1$ equals 9 bar. The drop of fluid pressure at the orifice 315 is the same as that at the orifice 325; therefore, the force acting upon the housing or plunger 316 as a result of the prevailing fluid pressure $p_2$ changes when the second valve including the piston 322 opens, i.e., the restoring force acting upon the piston 301 is changed. Such variation of restoring force, multiplied by the effective area of the surface at A1 entails a change of the consumer pressure $p_v$ as a function of the control pressure $p_s$, and this brings about the advantages which were discussed with reference to FIGS. 2, 2b and 2d, i.e., the characteristic curve denoting variations of consumer pressure $p_v$ in dependency upon changes of the control pressure $p_s$ exhibits a first section whose slope or incline is much less pronounced than that of the second section. The steeper second section is a consequence of opening of the second valve, i.e., of the establishment of a path for the flow of fluid from the bore 314 into the outlet 323.

An advantage of the valves which are shown in FIG. 3 (namely the placing of the plunger or housing 316 into the bore of the housing 302 for the valving element 301, and the placing of the valving element 322 and valve spring 321 into the housing 316) is that the space requirements of these valves are minimal. The second valve including the parts 316, 321, 322 can be said to constitute a directional control valve which is fully confined in the housing 302 of the primary valve 300. A characteristic feature of this directional control valve is that, when the plenum chamber 320 is unsealed in response to a shifting of the valving element 322 against the opposition of the valve spring 321, there develops an abrupt flow of fluid into the outlet, i.e., there is no (or no appreciable) distance or path modulation.

Figure 4:
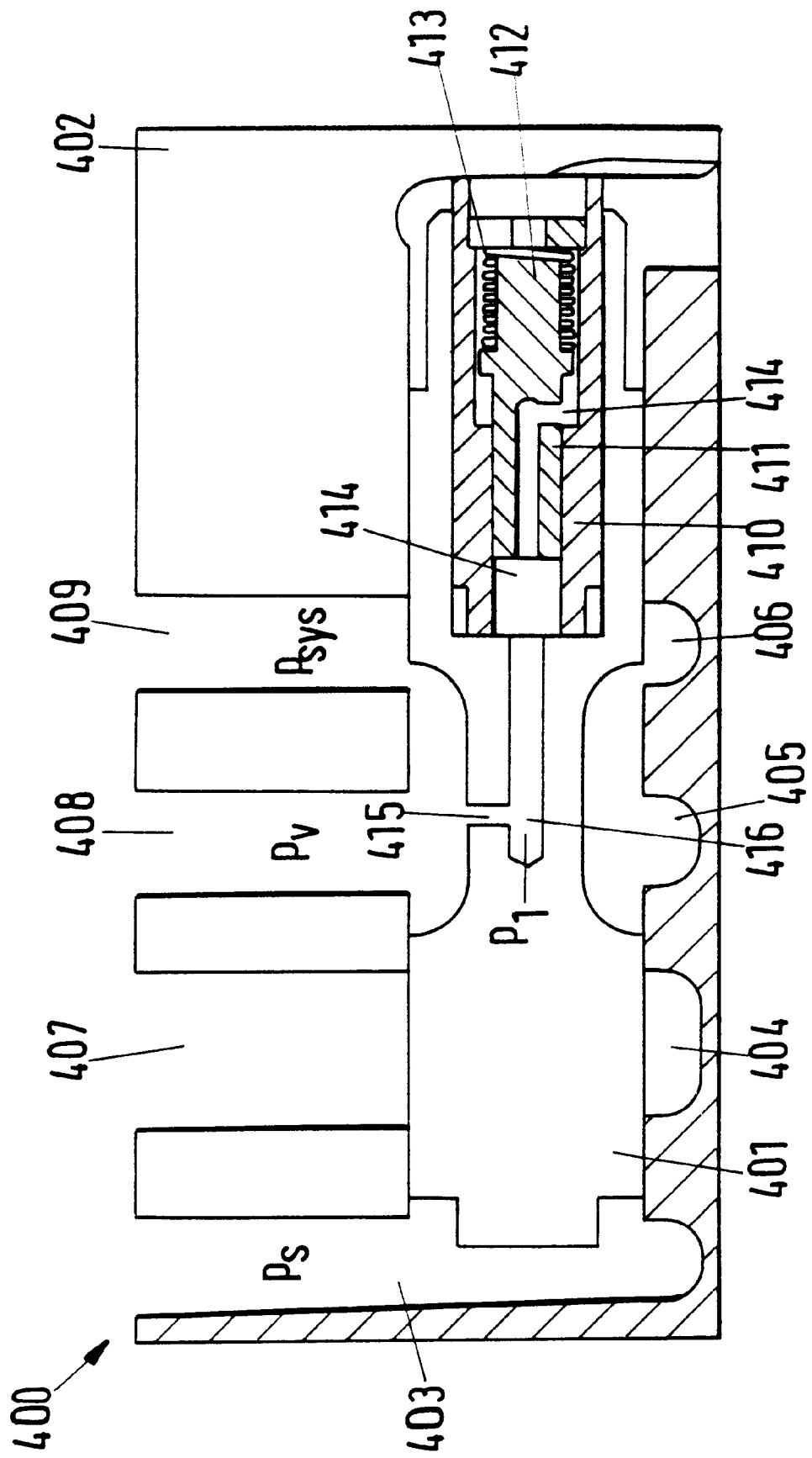
FIG. 4 is a similar fragmentary sectional view of two valves in a further fluid-operated system.

FIG. 4 shows two valves which constitute modifications of those shown in FIG. 3 The primary valve 400 has a body or housing 402 with an elongated bore or hole for an axially reciprocable valving element or piston 401. The housing 402 defines a chamber 403 wherein the fluid is maintained at a control pressure $p_s$ established by a control unit and an actor (not shown). In addition, the housing 402 is provided with spaced-apart substantially annular chambers 404, 405 and 406 which surround the bore for the piston 401 and respectively communicate with conduits 407, 408 and 409. The conduit 407 can be said to constitute an outlet connecting the chamber 404 to a tank or a sump of a transmission or another hydraulic unit, not shown. The conduit 408 supplies fluid (at a pressure $p_v$) to at least one consumer (such as as a hydraulically operated friction clutch, not shown), and the conduit 409 supplies fluid at system pressure $p_{sys}$ from a pump, an accumulator or another fluid pressurizing unit.

The bore of the housing 402 confines a reciprocable plunger or valve body 410 corresponding to the part 316 in the structure of FIG. 3, and a bore 414 of the plunger 410 receives an axially reciprocable valving element or piston 411 of a secondary valve 412 which further includes a valve spring 413. The valve 412 is a distributor or a directional control valve. A characteristic feature of the valve 412 is that it continuously connects the bore 414 with an outlet 414a when the pressure of fluid in the bore 414 has risen to a value at which the valve spring 413 is compelled to yield and allows the piston 411 to assume the axial position of FIG. 4. The piston 401 has a neck portion provided with a flow restricting orifice 415 which establishes communication between the chamber 415 and a bore 416 leading to the bore 414. The consumer pressure $p_v$ in the conduit 408 is modulated via flow restricting orifice 415 when the second valve 412 is open.

Figure 5:
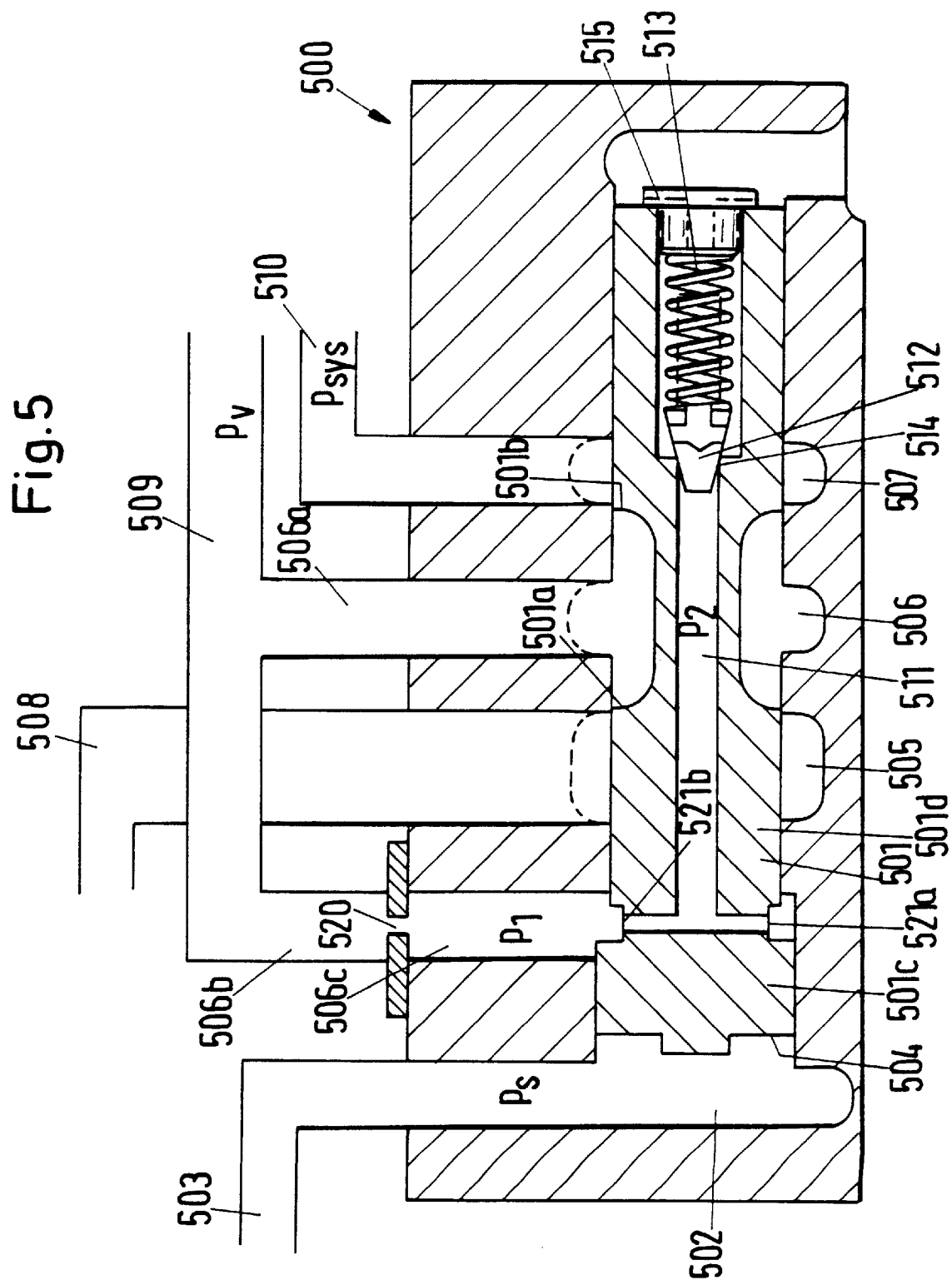
FIG. 5 is a similar fragmentary sectional view of two valves in an additional fluid-operated system.

FIG. 5 shows a first or primary valve 500 having a piston 501 which is axially reciprocable in a bore or hole of a valve body or housing. A chamber 502 of the valve housing contains fluid at a control pressure $p_s$; such fluid is supplied by a conduit 503 and acts upon the adjacent end face or surface 504 of the piston 501. The housing of the valve 500 is further provided with substantially annular chambers 505, 506 and 507. The chamber 505 communicates with a conduit 508 leading to a tank or to a sump (not shown); an extension 506a of the chamber 506 supplies fluid at a pressure $p_v$ to one or more consumers by way of a conduit 509; and the chamber 507 receives fluid at system pressure $p_{sys}$ from a pump, an accumulator or the like via conduit 510.

The consumer pressure $p_v$ can be regulated (as a function of the control pressure $p_s$) by varying the axial position of the piston 501, i.e., the positions of the edge faces or shoulders 501a and 501b on the piston 501 relative to the internal edge faces or shoulders of the valve housing at the axial ends of the chambers 505, 506 and 507.

The left-hand section or portion 501c of the piston 501 has a cross-sectional area greater than that of the adjacent portion 501d. In that axial position of the piston 501 which is shown in FIG. 5, a branch 506b of the conduit 509 has its terminal 506c at the shoulder between the sections 501c, 501d of the piston 501. A flow restrictor or throttle 520 is provided in the branch 506b adjacent the terminal 506c. The pressure $p_1$ in the terminal 506c acts upon the annular shoulder between the sections 501c, 501d of the piston 501 and thus urges the piston 501 in a direction to the left, as viewed in FIG. 5. The force acting upon the piston 501 due to the pressure $p_1$ in the terminal 506c is opposed by the force which is attributable to the control pressure $p_s$ of fluid in the chamber 502. Thus, the characteristic curve of the valve 500 can be varied by changing the pressure $p_1$ of fluid in the terminal 506c.

The piston 501 has an axial bore 511 wherein the pressure $p_2$ determines the condition or setting of a second valve including a valving element 512 biased by a valve spring 513 so that it seals the end 514 of the bore 511 from an outlet 523 when the second valve is closed.

The right-hand end of the axial passage in the piston 501 for the second valve is sealed or closed by a stopper or plug 515. The spring 513 reacts against the plug 515 and urges the valving element 512 to the illustrated position in which the second valve is closed, i.e., the end 514 of the bore 511 is sealed from the outlet 523.

When the force which is attributable to the pressure $p_2$ multiplied by the cross-sectional area of the bore 511 suffices to cause the spring 513 to store energy (or to store additional energy), the second valve opens. The flow restrictors 520, 521a and 521b then cause the consumer pressure $p_v$ to drop to $p_1$ and thereupon to $p_2$, i.e., the magnitude of the restoring force acting upon the piston 501 in a direction to the left (namely the product of the pressure $p_1$ and the effective area of the shoulder between the piston sections 501c, 501d) is changed.

It will be seen that the flow restrictor 520 need not be provided within the body or housing of the primary valve 500, i.e., this flow restrictor is or can be installed in the branch 506b of the conduit 509 leading to the consumer(s) of fluid at the pressure $p_v$.

The throttling actions of the flow restrictors 520, 521a and 521b can be selected to establish a desired fluid pressure $p_1$ and/or $p_2$. This renders it possible to select the slope(s) of the characteristic curve, such as the slope of the section 100 and/or the slope of the section 107 of the characteristic curve shown in the coordinate system of FIG. 2.

Figure 6:
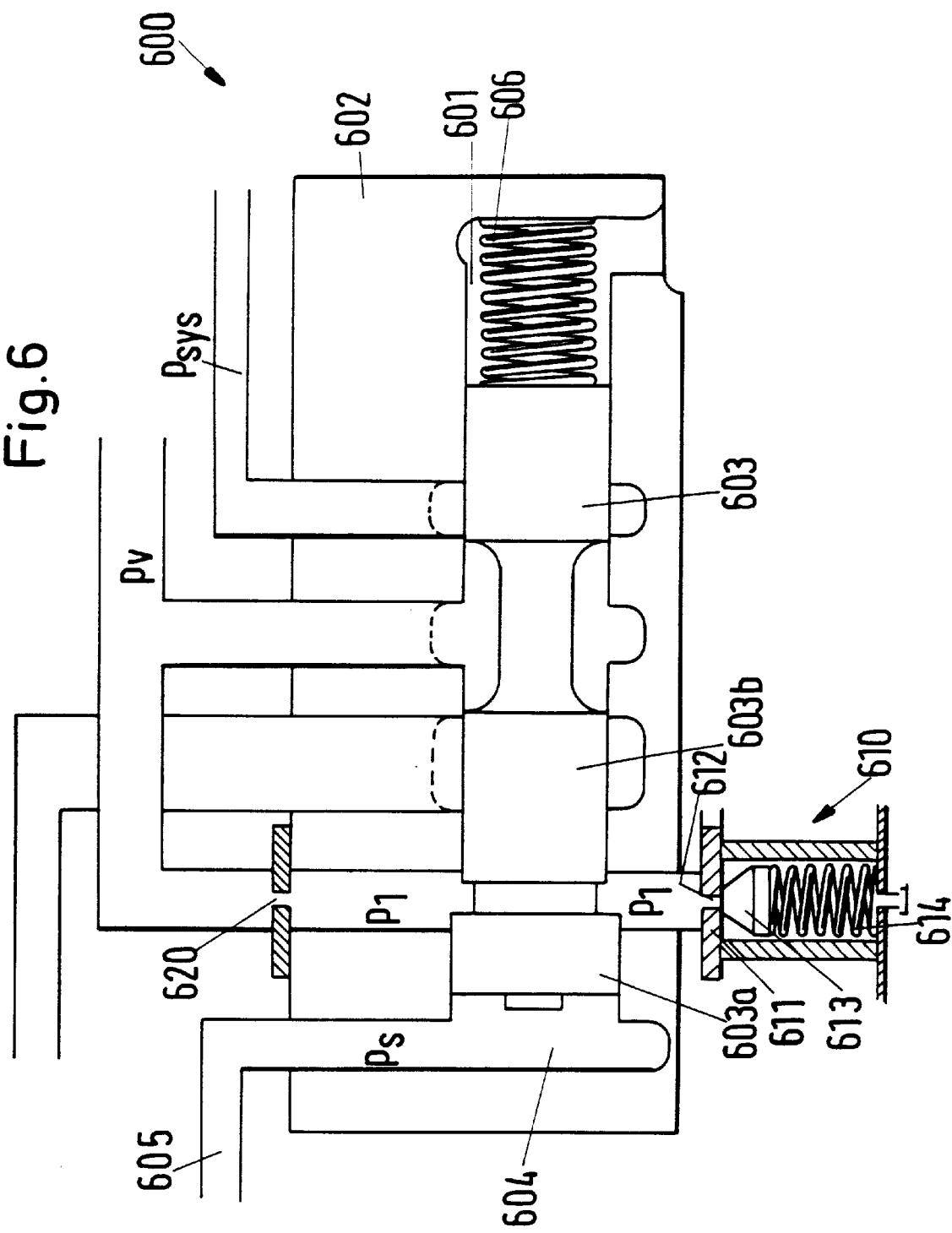
FIG. 6 is a similar fragmentary sectional view of two valves in still another fluid-operated system.

The first or primary valve 600 of FIG. 6 comprises a body or housing 602 with a bore 601 for an axially reciprocable piston-like valving element 603 which is biased by a helical valve spring 606 reacting against the housing 602. The spring 606 yields when the force corresponding to the product of control pressure $p_s$ in a chamber 604 of the housing 602 and of the exposed left-hand end face or surface of the larger-diameter section or portion 603a of the piston 603 reaches or exceeds a threshold value.

The second valve 610 of the fluid pressure influencing means shown in FIG. 6 is installed within or without the housing 602 of the primary valve 600 but at a location spaced apart from (i.e., not in) the piston 603. The valve 610 comprises a diaphragm 611 with an orifice 612 which is sealed by a spherical, conical, frustoconical or otherwise configurated valving element 613 under the bias of a coil spring 614 when the valve 610 is closed. When the pressure $p_1$ (multiplied by the cross-sectional area of the orifice 612) overcomes the bias of the spring 614, the valve 610 opens and permits fluid to flow from the conduit 609 (pressure $p_v$) through the flow restrictor 620 and orifice 612 of the diaphragm 611 into the outlet of the valve 610. When the valve 610 is open, the pressure $p_1$ is a function of the throttling action of the flow restrictor 620 and of the diaphragm 611 (orifice 612). The restoring force acting upon the piston 603 in a direction to the left is then a product of the modified pressure $p_1$ and the effective area of the shoulder between the sections or portions 603a, 603b of the piston 603; this brings about a planned or concerted or intended change of the characteristic curve of the primary valve 600.

FIG. 7 shows schematically certain component parts of a motor vehicle 700. The power train of this vehicle includes a prime mover 703 (e.g., an internal combustion engine or a hybrid structure employing an electric motor), a transmission 704 and a torque transmitting device (such as a clutch and/or a torsional vibration damper) 705 serving to receive torque from the output element of the engine and to transmit torque to an input element of the transmission. The transmission 704 drives a unit 712 which can reverse the direction of rotation of the input element of a differential 713 driving the axles 714 (one shown) for the wheels 715. Suitable means for reversing the direction of rotation of an output element are disclosed, for example, in the aforementioned U.S. Pat. No. 5,169,365 to Friedmann. It is also possible to employ a unit 712 which embodies one or more planetaries with brakes which are operable to reverse the direction of rotation of the input element of the differential 713. If desired, the unit 712 can be installed upstream of the transmission 704, i.e., to reverse (when necessary) the direction of rotation of the input element of the transmission 704.

The transmission 704 can constitute an infinitely or continuously variable transmission (CVT) of the type disclosed in the aforementioned U.S. Pat. Nos. 5,135,091 (Albers et al.) and 5,169,365 (Friedmann) or in U.S. Pat. No. 5,295,915 (the disclosure of the '915 patent is also incorporated herein by reference). The illustrated transmission 704 comprises two adjustable pulleys or sheaves 707 and 708 each of which includes an axially fixed flange and an axially adjustable flange. An endless flexible element (such as a V-belt or a chain) 711 is trained over the sheaves 707 and 708 to transmit forces or torque in the required direction and at the required rate.

The left-hand flange of the sheave 707 is adjustable by two consumers in the form of cylinder and piston units 710c, 710d, and the right-hand flange of the sheave 708 is adjustable by two additional consumers in the form of cylinder and piston units 710a, 710b. The axially adjustable flanges can change the diameters of those portions of the flexible element 711 which are looped over the sheaves 707, 708 and/or the force with which the looped portions of the element 711 are engaged by the adjacent flanges. One cylinder and piston unit of each pair serves to select the just mentioned force (i.e., the magnitude of the torque which the element 711 can transmit between the sheaves 707 and 708), and the other cylinder and piston unit of each pair serves to select the ratio of the transmission 704 (i.e., the sizes of those portions of the endless flexible element 711 which are trained or looped around the respective sheaves).

The cylinder and piston units 710a, 710b and 710c, 710d are the consumers of a fluid-operated system 702 which embodies one form of the present invention. The system 702 includes a valve block 717 (such block can comprise one of the previously described pairs or sets of primary and secondary valves), and a pump 716 or another suitable fluid pressurizing unit. The reference characters 719 and 720 denote conduits which respectively supply pressurized fluid at consumer pressure from the valve block 717 to the consumers 710c, 710d and 710a, 710b. The control unit of the system 702 is shown at 701; this control unit performs the function of the control unit 5 shown in FIG. 1. The torque transmitting system 705 also constitutes a consumer of the fluid-operated system 702 and is connected with the valve block 717 by an actor 718. Conductors 721 are provided to transmit signals between the control unit 701 on the one hand, and the prime mover 703, the valve block 717 and the unit 716 on the other hand. Additional signal transmitting connections are or can be provided, if necessary.

Figure 8:
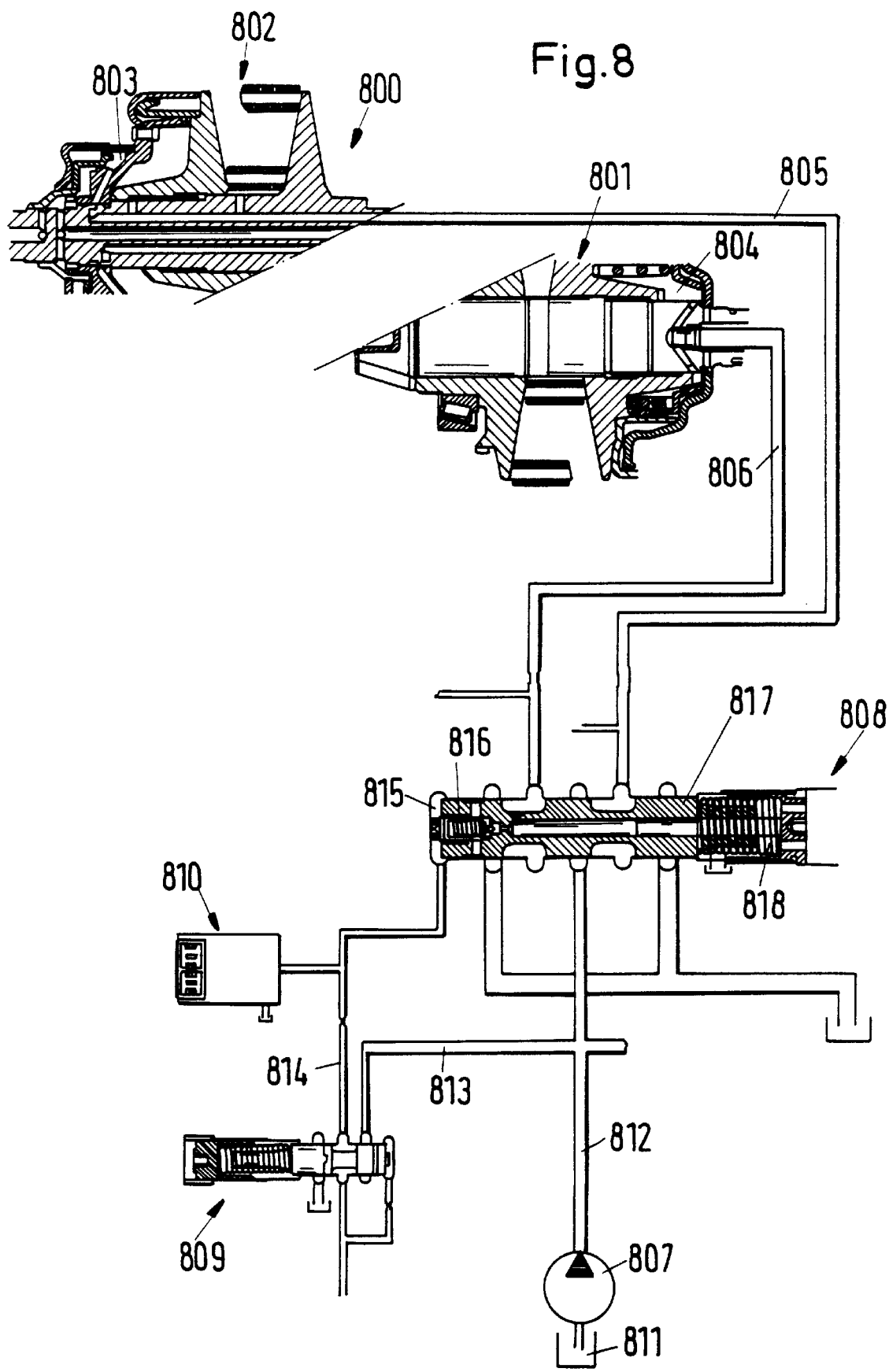
FIG. 8 is a fragmentary diagrammatic view of certain parts of a fluid-operated system which can be utilized in the motor vehicle of FIG. 7.

FIG. 8 shows certain constituents of a fluid-operated system (such as a hydraulic system) which includes means for shifting into selected ratio an automated or automatic (continuously variable) transmission (CVT) 800, e.g., a transmission corresponding to that shown at 704 in the motor vehicle 700 of FIG. 7. FIG. 8 merely shows portions of two adjustable pulleys or sheaves 801, 802 each of which includes an axially fixed flange and an axially adjustable flange. The axially movable flange of the sheave 801 can be shifted by at least one cylinder and piston unit (consumer) 804, and at least one analogous cylinder and piston unit (consumer) 803 is provided to change (when necessary) the position of the axially adjustable flange of the sheave 802. As already pointed out above with reference to the transmission 704 of FIG. 7, the positions of the axially adjustable flanges of the sheaves 802, 803 can be changed in order to select a particular transmission ratio or a particular torque. The connections between the cylinder and piston units 803, 804 and the valves of the fluid-operated system of FIG. 8 respectively comprise conduits 805 and 806.

In order to select the pressure of hydraulic fluid (consumer pressure) which is required to automatically shift the transmission of FIG. 8 into a particular gear, the fluid-operated system comprises a set of valves including a first or primary valve 808 and two additional valves 809, 810. The valve 808 has a housing or body 808a (see FIG. 9) with a chamber 854 which receives fluid at system pressure from a pump 807 through a conduit 812. The pump 807 can draw hydraulic fluid from a source 811 (e.g., a tank).

The valve 808 modifies (when necessary) the system pressure of fluid supplied by the conduit 812 and determines the consumer pressure of fluid in the conduits 805, 806, i.e., the pressure of fluid which is supplied to the consumers 803, 804, respectively.

The conduit 812 further supplies fluid to a conduit 813 leading to the valve 809 which determines the pressure of fluid in a conduit 814 containing a flow restrictor and being connected to the valves 808, 810. The purpose of the valve 809 is to cooperate with the valve 810 in order to select the control pressure $p_s$ in the conduit 814 and in the chamber 815 of the primary valve 808. Thus, the valves 809, 810 can be said to constitute an actor which selects the control pressure $p_s$ in the chamber 815 in a manner analogous to that described with reference to the actor 6 in the system 1 of FIG. 1. The value of the control pressure $p_s$ in the chamber 815 is determined by the current i (see FIG. 10) which is supplied to the valve 810 (this valve can constitute an on-off, a pilot or a relay valve), and the characteristics of the current i are determined by a control unit (not shown) corresponding to the control unit 5 in the system 1 of FIG. 1. The control pressure $p_s$ determines the axial position of the piston 817 in the bore or hole of the housing 808a of the primary valve 808; this piston is biased by a valve spring 818.

Axial shifting of the piston 817 under or against the bias of the spring 818 enables the shoulders of the housing 808a and the shoulders of the piston 817 to establish and/or close certain paths for the flow of fluid from the conduit 812 to the conduit 805 and/or 806 and to determine, in a planned manner, the pressure $p_v$ of fluid in the conduit 805 and/or 806.

Figure 9:
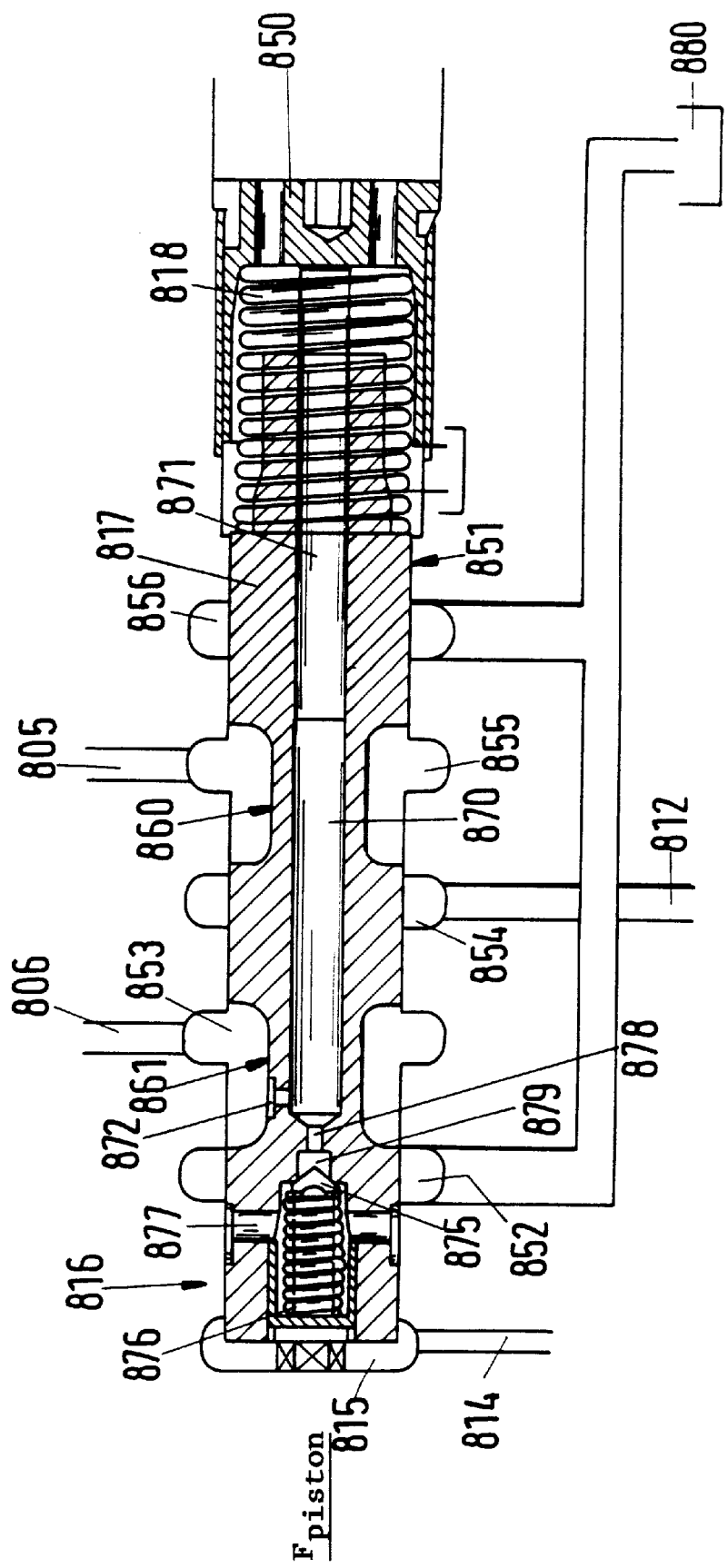
FIG. 9 is a fragmentary axial sectional view of two valves in the structure which is shown in FIG. 8.

The arrangement of valves shown in FIG. 8 further comprises a (secondary) valve 816 (corresponding, for example, to the valve 50 shown in FIG. 1) which is installed in the piston 817 of the primary valve 808 and responds to a predetermined fluid pressure, i.e., to a pressure which causes the valve 816 to open and to thus establish a path for the flow of fluid into a sump (shown at 880 in FIG. 9). This causes the valve 808 to influence the fluid pressure in a manner to be described with reference to FIG. 9.

The valve 808 which is shown in FIG. 9 comprises the aforementioned housing or body 808a having an axial bore or hole 851 for the piston 817. The housing 808a is provided with the aforementioned chamber 815 and with additional (preferably at least substantially annular) internal chambers 853, 854, 855, 856 surrounding the bore 851. One end of the bore 851 for the piston 817 is sealed by a stopper or plug 850. The chamber 815 receives fluid (at the control pressure $p_s$) from the aforementioned conduit 814 (i.e., from the pump 807 via conduits 812, 813), and the pressure in this chamber determines the axial position of the piston 817. The pressure $p_s$ in the chamber 815, multiplied by the effective area of the end face or surface $F_{piston}$ at the left-hand axial end of the piston 817 shown in FIG. 9 furnishes a force $F_A$ which urges the piston 817 to stress (or to further stress) the valve spring 818, i.e., $F_A p_s * F_{piston}$. The spring 818 is normally installed in a prestressed condition so that it reacts against the plug 850 and bears against the left-hand end face or surface $F_{piston}$ of the piston 817.

The piston 817 is provided with axially spaced-apart circumferentially complete peripheral grooves 860, 861 bounded by edge faces or shoulders which determine the establishment or interruption of paths for the flow of hydraulic fluid between certain chambers in the valve housing 808a. The chamber 854 receives fluid at system pressure $p_{sys}$ from the pump 807 by way of the conduit 812; this chamber can be communicatively connected with the chamber 853 or 855, depending upon the axial position of the piston 817. The chambers 853 and 855 respectively supply fluid at consumer pressure $p_v$ to the conduits 806 and 805. When the chamber 853 is sealed from the chamber 854, it can communicate with the sump 880 through a chamber 852 and a conduit 880a. When the chamber 855 is sealed from the chamber 854, it can communicate with the sump 880, again through the conduit 880a. In other words, the conduit 805 can receive from the conduit 812 a pressurized fluid via chambers 854, 855 when the conduit 806 communicates with the sump 880, and vice versa.

If the fluid pressure $p_s$ in the chamber 815 is or approximates zero, the spring 818 maintains the piston 817 in an axial position in which the piston is or can be located at least slightly to the left of the position shown in FIG. 9 and in which the chamber 853 (and hence the conduit 806) communicates with the chamber 852 via groove 861 and hence with the sump 880 via conduit 880a. At the same time, the conduit 812 communicates with the conduit 805 by way of the chamber 854, groove 860 and chamber 855.

If the control pressure $p_s$ in the chamber 815 is thereupon raised so that the piston 817 moves to the right against the opposition of the spring 818, for example, to an axial position in which the chamber 855 is connected to the sump 880 by way of the groove 860, chamber 856 and conduit 880a, the pressure of fluid in the conduit 805 is reduced (e.g., all the way to zero). At such time, the conduit 806 receives pressurized fluid from the conduit 812 via chamber 854, groove 861 and chamber 853.

The piston 817 has an elongated axial bore 870 which extends all the way to the plug 850 and receives an axially reciprocable plunger 871. The left-hand portion of the bore 870 communicates with a radially extending orifice 872 which further communicates with the groove 861 in the peripheral surface of the piston 817, i.e., with the chamber 853 when the piston 817 is caused to assume the axial position which is shown in FIG. 9. The orifice 872 ensures that the pressure in the bore 870 is less than in the groove 861.

The valve 816 is installed in another axial bore of the piston 817, and this other bore is in communication with the bore 870 by way of a flow restrictor 878. The latter communicates with a plenum chamber 879 which is normally sealed by the head of a piston or plunger 875 in response to the bias of a spring 876 forming part of the valve 816. The pressure in the chamber 879 is less than that in the bore 870 due to the provision of the flow restrictor 878. The valve 816 opens when the force generated by the fluid pressure in the chamber 879, multiplied by the effective area of the surface of the piston 875 exceeds the bias of the spring 876. This establishes communication between the bore 870 and an outlet 877 of the valve 816. Thus, the pressure in the chamber 879 can be reduced to zero when the outlet 877 communicates with the chamber 852 and hence with the conduit 880a in the corresponding axial position of the piston 817.

When the secondary valve 816 is closed, the piston 817 of the primary valve 808 is being acted upon by the control pressure of fluid in the chamber 815 and by the spring 818. Furthermore, the piston 817 is then acted upon by a force caused by the fluid pressure in the bore 870 multiplied by the cross-sectional area of this bore, and such force acts in parallel with the bias of the spring 818 so that a higher control pressure is necessary to open the valve.

When the valve 816 opens in response to the application of a predetermined pressure, the magnitude of the force acting upon the piston 817 decreases due to a drop of fluid pressure in the bore 870. Thus, the magnitude of the restoring force acting upon the piston 817 is reduced and the characteristic curve of the consumer pressure $p_v$ (as a function of the pressure $p_s$ in the chamber 815) develops a change of inclination or slope analogous to that shown between the sections 100, 107 of the characteristic curve in the coordinate system of FIG. 2, i.e., the next-following section of the curve becomes steeper than the preceding section.

The flow restrictors 872, 878 and the bias of the spring 876 determine that range of consumer pressures $p_v$ wherein the curve denoting the entire gamut of such pressures develops the transition between the less inclined and steeper sections or ranges.

FIG. 10 shows a coordinate system wherein the pressure of fluid supplied to the consumers 803, 804 is measured along the ordinate and the changes of current i (namely current supplied to or by the control unit for the valve 810 in FIG. 8) are measured along the abscissa. It is also possible to vary the consumer pressure $p_v$ as a function of the control pressure $p_s$ in a manner other than in response to varying the current i.

The curve 901 denotes the changes of fluid pressure $p_v$ in the consumer 803, and the curve 902 denotes pressures which are applied to the fluid in the consumer 804.

When the regulation of current i begins, the pressure ($p_1$) of fluid in the consumer 803 assumes a maximum value $p_{1max}$ to thereupon decrease linearly as a function of changes of the current i. The pressure of fluid in the consumer 803 decreases at least close to zero when the current i assumes the value $i_1$.

The pressure $p_2$ begins to rise from $i_1$ on at a first rate up to $i_2$ and thereupon at a higher rate from $i_2$ to $i_3$. The pressure $p_2$ reaches the value $p_{2k}$ when the value of i reaches $i_2$; this is the instant when the valve 816 opens. from there on, the next-following section of the curve 902 is steeper and reaches a maximum value $p_{2max}$ when i reaches the value $i_3$.

The feature that the curve 902 includes two sections having different slopes renders it possible to regulate the corresponding range of fluid pressures $p_2$ with a very high degree of accuracy (between $i_1$ and $i_2$), and to relatively rapidly increase the pressure $p_2$ between $i_2$ and $i_3$. Moreover, the (lower) pressures $p_2$ between $i_1$ and $i_2$ are not influenced by the higher pressures $p_2$ between $i_2$ and $i_3$.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of fluid-operated systems for use in motor vehicles and, therefore, such adaptations should and are intended to be comprehended within the meaning and range of equivalence of the appended claims.

What is claimed is:

1. A fluid-operated system for use in a motor vehicle, comprising at least one fluid pressurizing unit; at least one consumer of pressurized fluid; and means for influencing the pressure of fluid in a path from said at least one unit to said at least one consumer as a function of at least one predeterminable variable, including pressure regulating means for imparting to the fluid in said path a plurality of different pressures, said pressure regulating means comprising a plurality of valves including a first valve and an auxiliary second valve, said first valve comprising a housing and a mobile valving element disposed in said housing and being acted upon by fluid which is pressurized by said at least one unit, said second valve including means for varying the effective area of at least one surface of said valving element which is being acted upon by pressurized fluid.

2. The system of claim 1, wherein the fluid is a hydraulic fluid and said at least one unit includes at least one pump.

3. The system of claim 1, wherein said valves are arranged to impart to the fluid a first pressure and to impart to the fluid a second pressure with an abrupt transition between said first and second pressures.

4. The system of claim 1, wherein said valves are arranged to impart to the fluid a first pressure and to impart to the fluid a second pressure with a gradual transition between said first and second pressures.

5. The system of claim 1, further comprising at least one fluid flow restrictor in said path upstream of said second valve as seen in a direction of fluid flow to said second valve.

6. The system of claim 1, wherein said valving element is movable relative to said housing in first and second directions and said first valve further comprises means for biasing said valving element in said first direction, said pressure regulating means further comprising control means for directing against said valving element fluid at a variable control pressure to urge said valving element in said second direction.

7. A fluid-operated system for use in a motor vehicle, comprising at least one fluid pressurizing unit; at least one consumer of pressurized fluid; and means for influencing the pressure of fluid in a path from said at least one unit to said at least one consumer as a function of at least one preselectable variable, including pressure regulating means for imparting to the fluid in said path a first pressure within a first range of varying pressures as a first function of said at least one variable, and a second pressure within a second range of varying pressures as a different second function of said at least one variable, said pressure regulating means comprising a plurality of valves including a first valve and an auxiliary second valve, said first valve comprising a housing and a mobile valving element disposed in said housing and being acted upon by fluid which is pressurized by said at least one unit, said second valve including means for varying the effective area of at least one surface of said valving element which is being acted upon by pressurized fluid.

8. The system of claim 7, wherein the fluid is a hydraulic fluid and said at least one unit includes at least one pump.

9. The system of claim 7, wherein the first pressures within said first range vary at a rate which is less pronounced than the variation of second pressures within said second range.

10. The system of claim 7, wherein the first pressures within said first range vary at a rate which is more pronounced than the variation of second pressures within said second range.

11. The system of claim 7, wherein said valves are arranged to impart to the fluid a series of first pressures within said first range and to thereupon impart to the fluid a series of second pressures within said second range with an abrupt transition from said first range.

12. The system of claim 7, wherein said valves are arranged to impart to the fluid a series of first pressures within said first range and to thereupon impart to the fluid a series of second pressures within a second range with a gradual transition from said first range.

13. The system of claim 7, further comprising at least one fluid flow restrictor in said path upstream of said second valve as seen in a direction of fluid flow to said second valve.

14. The system of claim 7, wherein said valving element is movable relative to said housing in first and second directions and said first valve further comprises means for biasing said valving element in said first direction, said pressure regulating means further comprising control means for directing against said valving element fluid at a variable control pressure to urge said valving element in said second direction.

15. A fluid-operated system for use in a motor vehicle, comprising at least one fluid pressurizing unit; at least one consumer of pressurized fluid; and means for influencing the pressure of fluid in a path from said at least one unit to said at least one consumer as a function of at least one predeterminable variable, including a first valve comprising a housing having a first chamber for receiving fluid from said at least one unit, a second chamber for supplying fluid to said at least one consumer, and a third chamber having a fluid-discharging outlet, said first valve further comprising a valving element movable in said housing to establish and terminate communication between selected ones of said chambers, said means for influencing further comprising a second valve disposed in said path between said second chamber and said at least one consumer and arranged to regulate the flow of fluid to said at least one consumer as a function of fluid pressure in one of said first and second chambers.

16. The system of claim 15, wherein said at least one unit includes at least one pump and the fluid is a hydraulic fluid.

17. The system of claim 15, further comprising at least one flow restrictor in said path between said second chamber and said at least one consumer.

18. The system of claim 15, wherein said second valve is an on-off valve.

19. The system of claim 15, wherein said second valve is a directional control valve.

20. The system of claim 15, wherein said second valve is disposed at least in part in said valving element of said first valve.

21. The system of claim 20, wherein said valving element comprises a first piston which is reciprocable in said housing and said second valve comprises a second reciprocable piston coaxial with said first piston.

22. The system of claim 20, wherein said valving element comprises a first piston reciprocable in said housing in directions of a predetermined axis, said second valve comprising a second piston reciprocable in at least substantial parallelism with said axis.

23. The system of claim 15, further comprising at least one flow restrictor in a conduit for conveying fluid to said second valve.

24. The system of claim 15, wherein said valving element is movable relative to said housing under the action of pressurized fluid in said first chamber, said second valve including means for varying the effective area of a surface of said valving element which is being acted upon by pressurized fluid.

25. The system of claim 15, wherein said second valve includes means for varying the rate of flow of pressurized fluid from said at least one unit against said valving element.

26. The system of claim 15, wherein said second valve has an open position and a closed position and the pressure of fluid upon said mobile valving element decreases in response to opening of said second valve.

27. The system of claim 15, wherein said valving element is movable in said housing in first and second directions and said first valve further comprises means for biasing said valving element in said first direction, said means for influencing further comprising control means for directing against said valving element fluid at a variable control pressure to urge said valving element in said second direction.

28. A fluid-operated system for use in a motor vehicle, comprising at least one fluid pressurizing unit; at least one consumer of pressurized fluid; and means for influencing the pressure of fluid in a path from said at least one unit to said at least one consumer as a function of at least one predeterminable variable, including a first valve comprising a housing having a first chamber for receiving fluid from said at least one unit, a second chamber for supplying fluid to said at least one consumer, and a third chamber having a fluid discharging outlet, said first valve further comprising a piston reciprocable axially in said housing in first and second directions and having different first and second surfaces arranged to be acted upon by pressurized fluid in a compartment of said housing in such a way that the fluid acting upon said first surface tends to move the piston in said first direction with a first force which is a function of fluid pressure in said compartment and the fluid acting upon said second surface tends to move the piston in said second direction with a second force which is a function of fluid pressure in said compartment, said piston being movable relative to said housing to establish and terminate communication between selected ones of said chambers and said means for influencing further comprising a second valve arranged to vary the pressure in said compartment and thus the magnitudes of said forces with attendant changes of the extent of movement of said piston relative to said housing.

29. The system of claim 28, wherein said surfaces have different areas and the extent of movement of said piston relative to said housing is a function of the difference between said first and second forces at a given fluid pressure in said compartment.

30. The system of claim 28, wherein the fluid is a hydraulic fluid and said at least one unit includes at least one pump.

31. The system of claim 28, wherein said at least one consumer comprises at least one cylinder and piston unit.

32. The system of claim 28, wherein said at least one consumer comprises at least one clutch.

33. The system of claim 25, wherein said at least one consumer comprises at least one torque converter.

34. The system of claim 28, wherein said at least one consumer comprises at least one transmission.

35. The system of claim 34, wherein said at least one transmission is an infinitely variable transmission.

36. The system of claim 28, wherein at least a portion of said second valve is disposed in said piston.

37. The system of claim 36, wherein said second valve comprises a piston which is coaxial with said piston of said first valve.

38. The system of claim 28, wherein said second valve is disposed in said housing.

39. The system of claim 28, wherein said second valve comprises a valving element which is movable at least substantially at right angles to the axis of said piston.

40. The system of claim 28, wherein said second valve is a check valve.

41. The system of claim 40, wherein said check valve comprises a housing having an orifice, a valving element in said housing of said check valve, and means for biasing said valving element to a position in which said valving element seals said orifice.

42. The system of claim 28, further comprising at least one flow restrictor in at least one of (a) a connection between said compartment and said second valve and (b) a connection between said housing and said at least one consumer.

43. The system of claim 28, wherein said second valve comprises a mobile valving element and further comprising at least one fluid pressure reducing flow restrictor disposed between at least one of (a) said valving element and said compartment and (b) said valving element and a connection to said at least one consumer.

44. The system of claim 28, further comprising a plurality of flow restrictors in said path.

45. The system of claim 44, wherein said flow restrictors exhibit at least substantially identical fluid flow restricting characteristics.

46. The system of claim 44, wherein said flow restrictors exhibit different flow restricting characteristics.

47. The system of claim 28, wherein said second valve is an on-off valve.

48. The system of claim 28, wherein said second valve is a directional control valve.

49. The system of claim 28, wherein said second valve comprises a second piston reciprocable in at least substantial parallelism with the axis of the piston of said first valve.

50. The system of claim 28, further comprising at least one fluid flow restrictor in said path.

51. A fluid-operated system for use in a motor vehicle, comprising at least one fluid pressurizing unit; at least one consumer of pressurized fluid; and means for influencing the pressure of fluid in a path from said at least one unit to said at least one consumer as a function of at least one predeterminable variable, including pressure regulating means for imparting to the fluid in said path a plurality of different pressures, said pressure regulating means comprising a plurality of valves including a first valve and an auxiliary second valve, said first valve comprising a housing and a mobile valving element in said housing, said second valve including means for varying a rate of flow of pressurized fluid from said at least one unit against said mobile valving element.

52. The system of claim 51, wherein said second valve has an open position and a closed position and the pressure of fluid upon said mobile valving element decreases in response to opening of said second valve.

53. A fluid-operated system for use in a motor vehicle, comprising at least one fluid pressurizing unit; at least one consumer of pressurized fluid; and means for influencing the pressure of fluid in a path from said at least one unit to said at least one consumer as a function of at least one preselectable variable, including pressure regulating means for imparting to the fluid in said path a first pressure within a first range of varying pressures as a first function of said at least one variable, and a second pressure within a second range of varying pressures as a different second function of said at least one variable, said pressure regulating means comprising a plurality of valves including a first valve and an auxiliary second valve, said first valve comprising a housing and a mobile valving element in said housing, said second valve including means for varying a rate of flow of pressurized fluid from said at least one unit against said mobile valving element.

54. The system of claim 53, wherein said second valve has an open position and a closed position and the pressure of fluid upon said mobile valving element decreases in response to opening of said second valve.

\* \* \* \* \*